United States Patent
Yamamoto

(10) Patent No.: US 7,616,395 B2
(45) Date of Patent: Nov. 10, 2009

(54) INFORMATION REPRODUCTION APPARATUS

(75) Inventor: Akira Yamamoto, Osaka (JP)

(73) Assignee: Panasonic Corporation, Osaka (JP)

( * ) Notice: Subject to any disclaimer, the term of this patent is extended or adjusted under 35 U.S.C. 154(b) by 348 days.

(21) Appl. No.: 11/660,517

(22) PCT Filed: Aug. 15, 2005

(86) PCT No.: PCT/JP2005/014907

§ 371 (c)(1), (2), (4) Date: Feb. 20, 2007

(87) PCT Pub. No.: WO2006/019073

PCT Pub. Date: Feb. 23, 2006

(65) Prior Publication Data

US 2007/0279784 A1 Dec. 6, 2007

(30) Foreign Application Priority Data

Aug. 20, 2004 (JP) ............................. 2004-241590

(51) Int. Cl.
- G11B 5/09 (2006.01)
- G11B 5/02 (2006.01)
- G11B 20/20 (2006.01)
- G11B 15/12 (2006.01)
- G11B 19/02 (2006.01)
- G11B 20/00 (2006.01)

(52) U.S. Cl. .............................. 360/51; 360/18; 360/24; 360/26; 360/27; 360/61; 369/47.28; 369/47.35; 369/47.15; 369/59.19

(58) Field of Classification Search ........................ None
See application file for complete search history.

(56) References Cited

U.S. PATENT DOCUMENTS

| 5,726,818 A | 3/1998 | Reed et al. ..................... 360/51 |
| 5,864,590 A | 1/1999 | Soubaras ..................... 375/341 |
| 5,963,518 A * | 10/1999 | Kobayashi et al. ....... 369/47.27 |

(Continued)

FOREIGN PATENT DOCUMENTS

JP      8-161829      6/1996

(Continued)

OTHER PUBLICATIONS

Gardner, F., "Interpolation in Digital Modems —Part 1: Fundamentals," IEEE Transactions on Communications, vol. 41, No. 3, Mar. 1993, pp. 501-507.

*Primary Examiner*—Sinh Tran
*Assistant Examiner*—Wanda M Negron
(74) *Attorney, Agent, or Firm*—Steptoe & Johnson LLP

(57) ABSTRACT

There is provided an information reproduction apparatus that can suppress degradations in the qualities of reproduced data and timing from due to interpolation errors when performing interpolation timing recovery, and that can avoid degradation in the stability of the system due to an increase in the timing recovery loop delay. An information reproduction apparatus (100) for reproducing data and timing from an analog signal including data information and timing information is provided with an expected value generator (106) for outputting plural expected values, and a maximum likelihood detector (107) for outputting data that corresponds to a sequence of the highest likelihood with an output sequence of an A/D converter among the plural expected value sequences, at the timing of a second clock.

10 Claims, 16 Drawing Sheets

U.S. PATENT DOCUMENTS

| | | | |
|---|---|---|---|
| 6,278,749 B1 * | 8/2001 | Jeon | 375/341 |
| 6,603,722 B1 | 8/2003 | Taguchi et al. | 369/59.21 |
| 2003/0067998 A1 | 4/2003 | Nakajima et al. | 375/341 |
| 2004/0130817 A1 * | 7/2004 | Fukushi et al. | 360/51 |

FOREIGN PATENT DOCUMENTS

| | | |
|---|---|---|
| JP | 9-161408 | 6/1997 |

\* cited by examiner

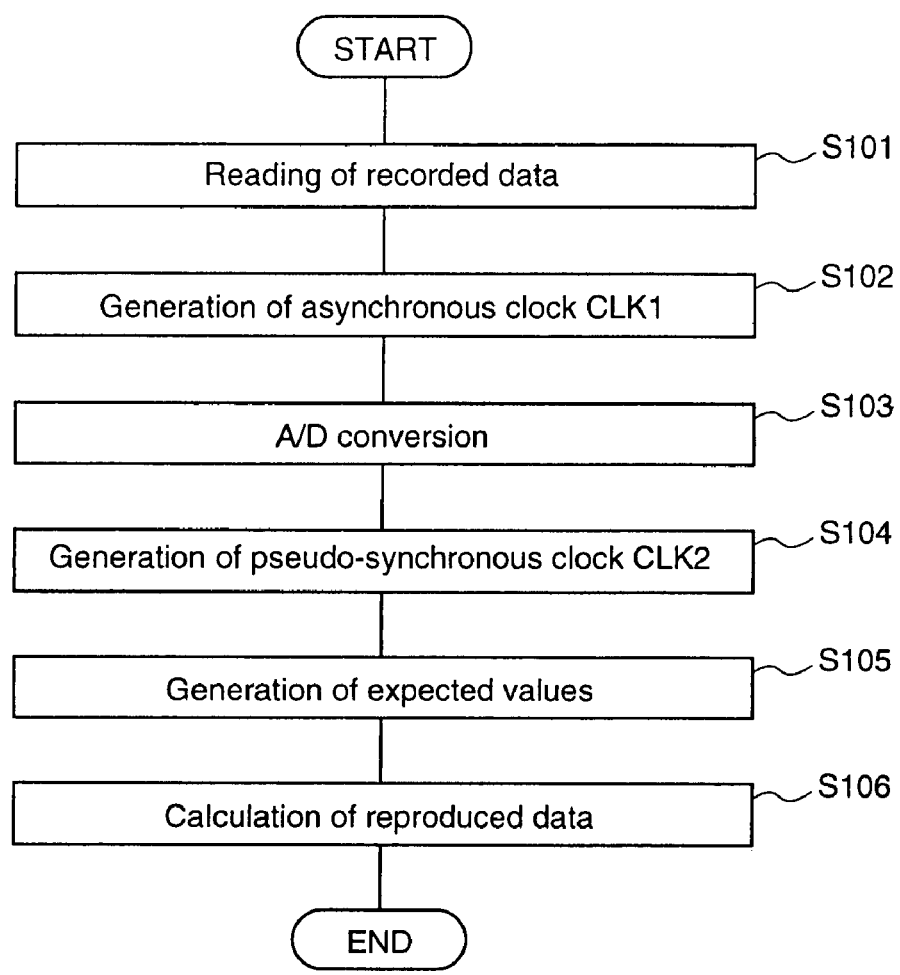

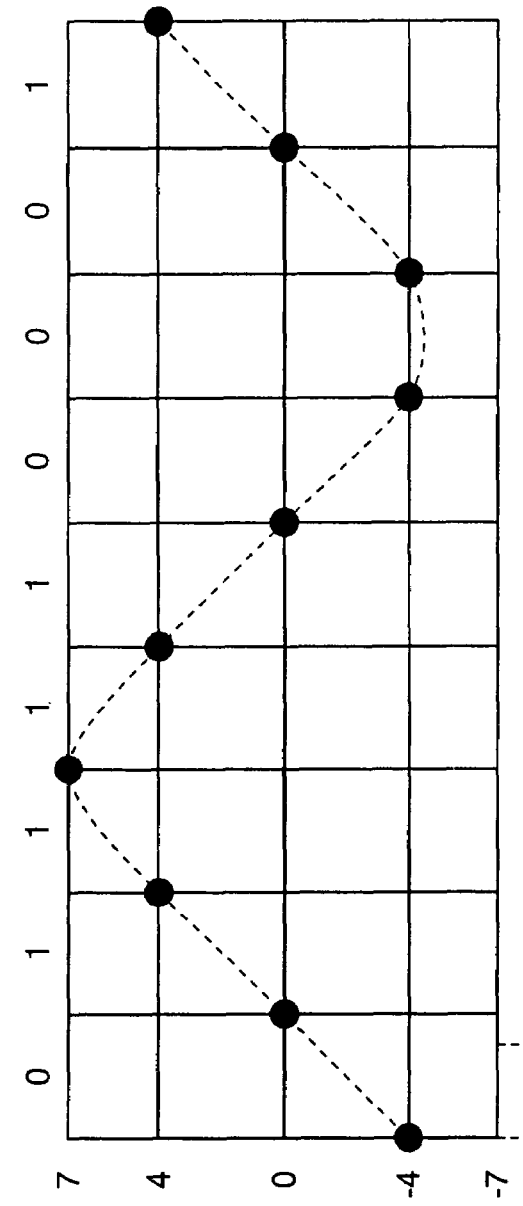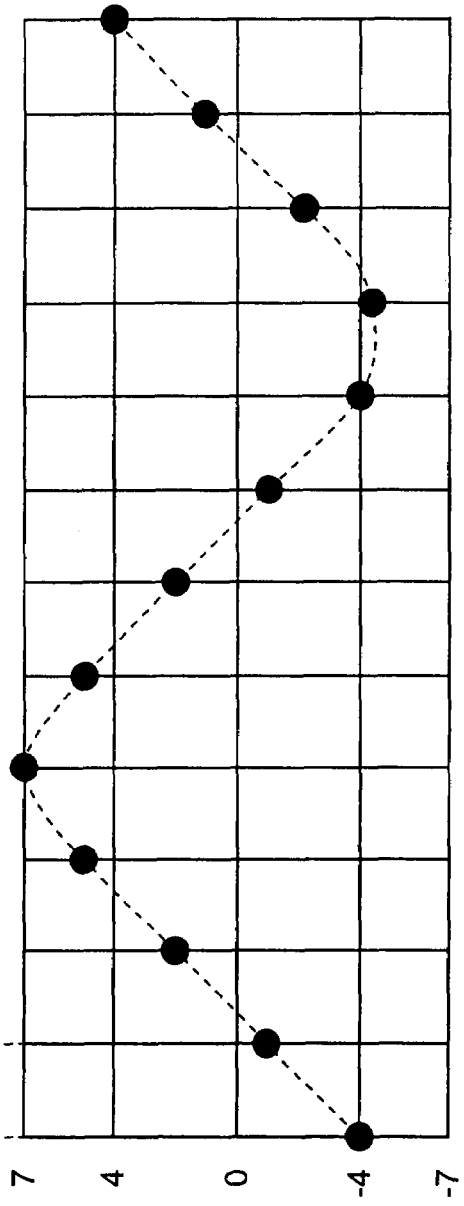

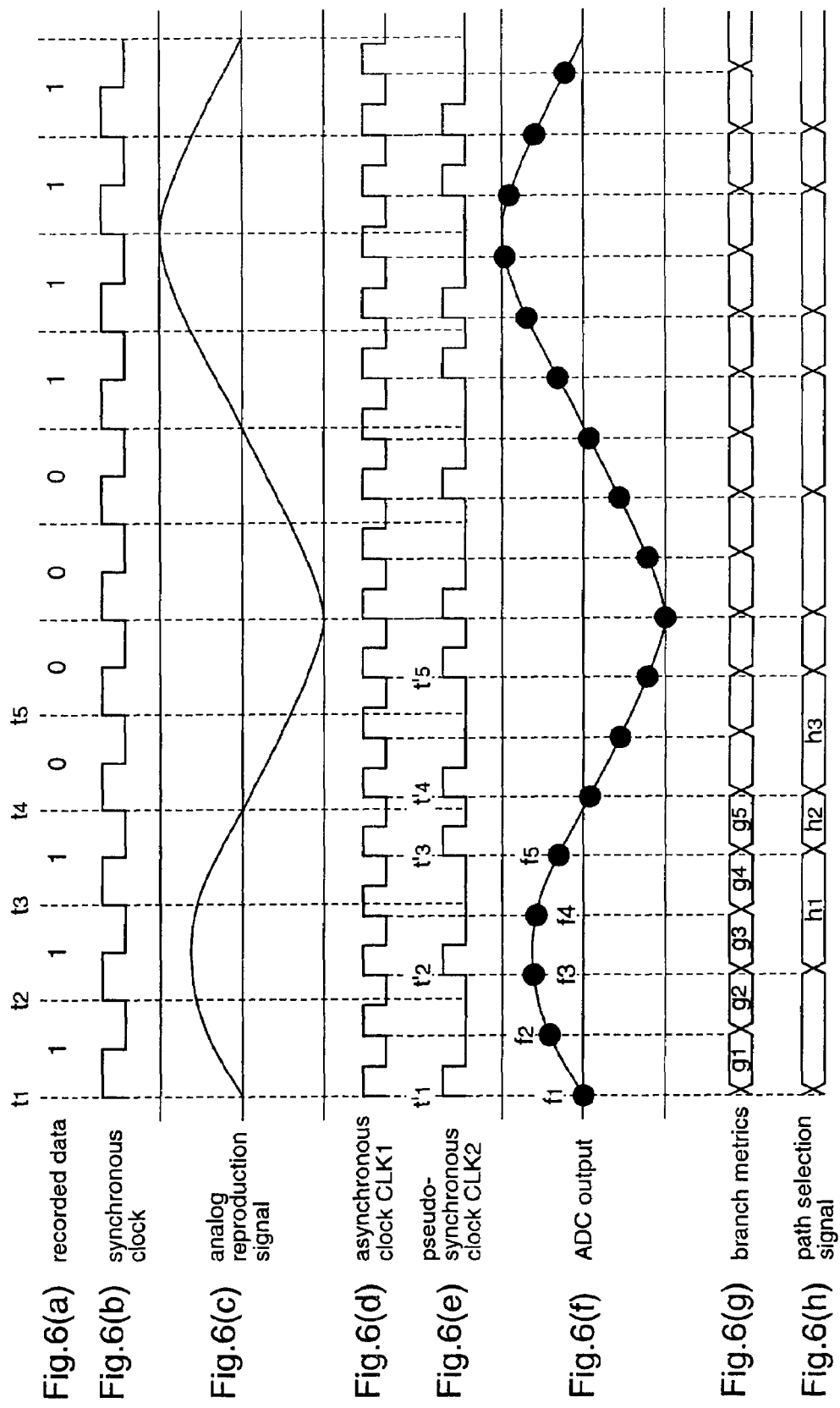

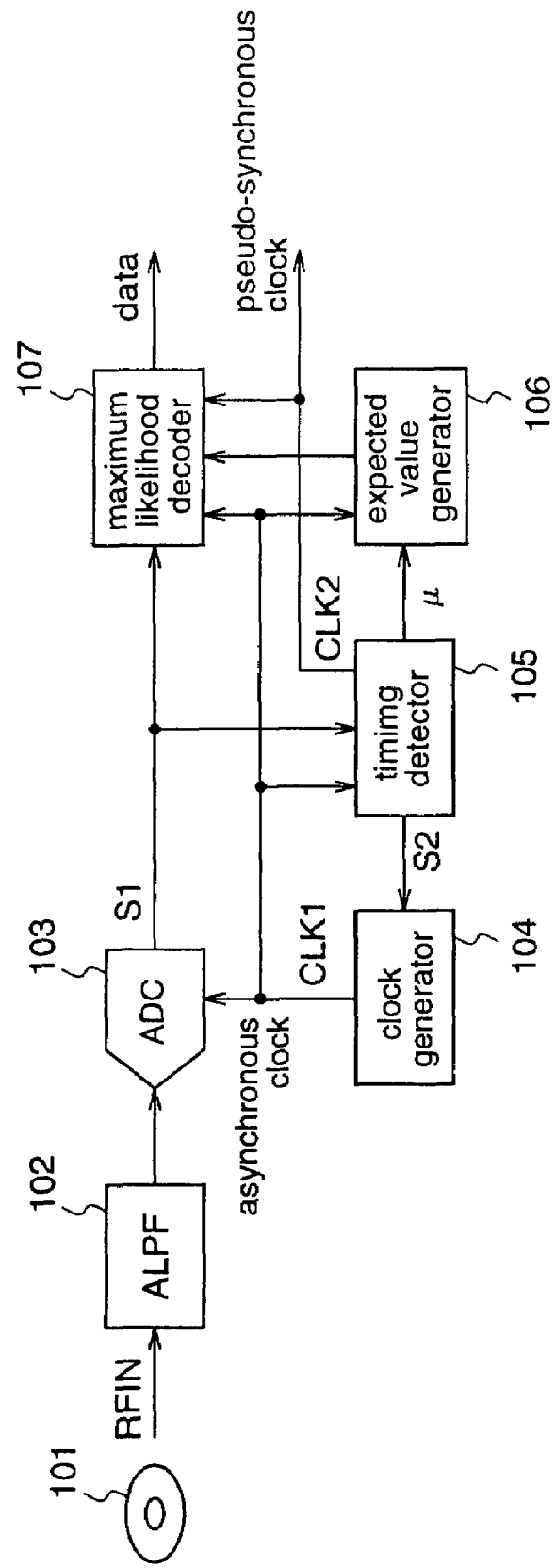

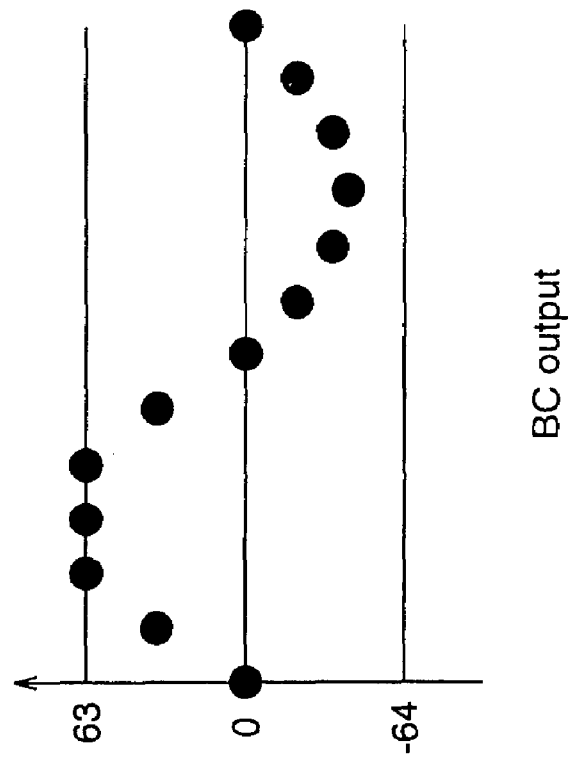
Fig.8(a) ADC output
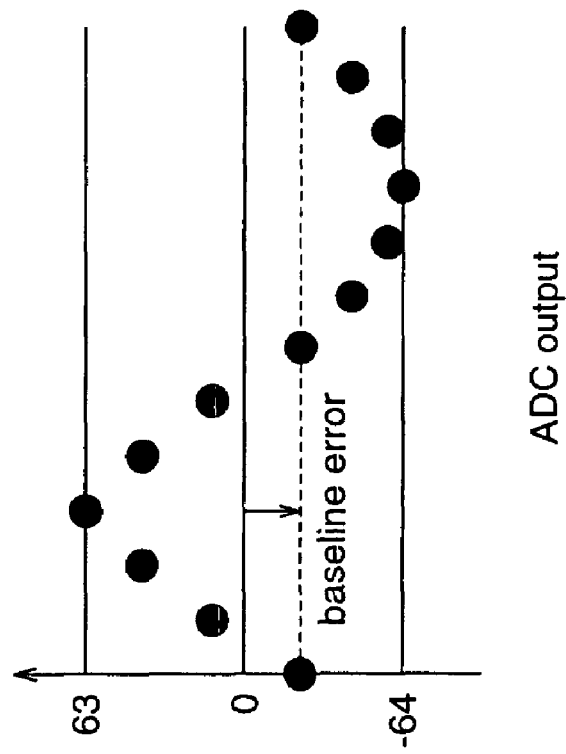
Fig.8(b) BC output

INFORMATION REPRODUCTION APPARATUS

The present application is based on International Application PCT/JP2005/014907, filed Aug. 15, 2005, which claims priority to Japanese Patent Application No. 2004-241590, filed Aug. 20, 2004, the entire contents of which are hereby incorporated by reference.

TECHNICAL FIELD

The present invention relates to an information reproduction apparatus, and more particularly, to an information reproduction apparatus for reproducing data and timing from an analog signal comprising data information and timing information.

BACKGROUND ART

Conventionally, information reproduction apparatuses (e.g., a read channel LSI core) for reproducing data and timing from an analog signal (e.g., an output signal from an optical pickup of a DVD) comprising data information and timing information have been disclosed in Non-Patent Document 1 (Floyd M. Gardner, "Interpolation in Digital Modems—Part I: Fundamentals", IEEE Transactions on Communications, Vol. 41, No. 3, p. 501-507, March, 1993), and Patent Document 1 (Japanese Published Patent Application No. Hei. 9-204622).

Both the information reproduction apparatuses disclosed in these literatures are constituted such that an analog signal that is read from an information recording medium is digitized with a clock that is not necessarily synchronized with a timing included in the analog signal, and then the timing is recovered by interpolation.

Hereinafter, the process of reproducing data and timing recorded on a medium such as a DVD by the above-mentioned construction will be described with reference to FIG. 13.

FIG. 13 is a diagram for explaining the conventional information reproduction apparatus.

The conventional information reproduction apparatus 1300 reproduces data and timing from an analog signal that is recorded on a medium 1301 such as a DVD and comprises data information and timing information, and the apparatus 1300 includes an ALPF (Analog Low Pass Filter) 1302, an A/D converter (ADC) 1303, a frequency synthesizer 1304, an interpolator 1305, a DEQ (Digital Equalizer) 1306, a TR (Timing Recovery Logic) circuit 1307, a controller 1308, a FIR (Finite Impulse Response) circuit 1309, and a Viterbi decoder 1310.

The ADC 1303 converts the analog signal that is read from the medium 1301 into a digital signal, and outputs the digital signal to the interpolator 1305. The frequency synthesizer 1304 supplies a clock of a predetermined frequency to the ADC 1303, the interpolator 1305, and the controller 1308. The interpolator 1305 generates a clock that is pseudo-synchronized with the timing of data recording into the medium 1301, and supplies the clock to the controller 1308, the FIR 1309, and the Viterbi decoder 1310. The DEQ 1306 equalizes a predetermined frequency component of the output signal from the interpolator 1305. The FIR circuit 1309 equalizes the output of the DEQ 1306 so that the output of the DEQ 1306 becomes a signal suited to a target PR system. The Viterbi decoder 1310 reproduces the data recorded on the medium 1301 on the basis of the output signal from the FIR circuit 1309.

Next, the operation will be described.

The data and timing recorded on the medium 1301 such as a DVD is read by an optical pickup (not shown) and reproduced as an analog signal. The analog data is amplified and offset-controlled so as to be suited to the input range of the ADC 1303 by a variable gain amplifier (VGA) (not shown) and an offset controller (not shown) which are provided in a stage prior to the ALPF 1302, respectively. Thereafter, the analog signal is inputted to the ALPF 1302, and a high frequency component thereof is removed. The analog signal outputted from the ALPF 1302 is converted into a digital signal by the ADC 1303. At this time, a sampling clock is supplied from the frequency synthesizer 1304. This clock is not necessarily synchronized with the timing clock that is recorded on the medium such as a DVD, and generally, it is a clock of a frequency faster than the timing clock. Further, the output clock of the frequency synthesizer 1304 is also inputted to the interpolator 1305 and the controller 1308.

The digital signal outputted from the ADC 1303 is not synchronized with the timing of the data recorded on the medium 1301. The interpolator 1305 synchronizes the digital signal with the timing by interpolation. That is, the interpolator 1305 receives information corresponding to a phase difference between the sampling clock and the timing from the controller 1308, and performs interpolation according to the phase difference to make synchronization. Further, the interpolator 1305 generates a clock that is pseudo-synchronized with the timing by thinning the sampling clocks.

The DEQ 1306 equalizes the output signal of the interpolator 1305. Since a DVD has a tendency that the amplitude of a high frequency component (e.g., 3T+3T pattern) decreases, the DEQ 1306 amplifies such component.

The TR circuit 1307 performs timing recovery using the output of the DEQ 1306. In the case of a DVD, since SYNC marks of 14T+4T appear at intervals of 1488T as shown in FIG. 14, the TR circuit 1307 detects a frequency error by detecting the interval between a SYNC mark and a SYNC mark. Further, the TR circuit 1307 detects a phase error on the basis of the value of a zerocross point. The frequency error and the phase error are inputted to the controller 1308.

The controller 1308 obtains an error between the sampling clock and the recorded timing on the basis of the frequency error and the phase error.

As described above, a timing recovery loop is constituted by the interpolator 1305, the DEQ 1306, the TR circuit 1307, and the controller 1308, and thereby timing recovery is carried out.

On the other hand, the output of the DEQ 1306 is inputted to the FIR circuit 1309. The FIR circuit 1309 further equalizes the output of the DEQ 1306 so that the output of the DEP 1306 becomes a signal suited to the target PR system (e.g., PR(3, 4,4,3)).

The Viterbi decoder 1310 performs error correction to the output of the FIR circuit 1309 by maximum likelihood decoding based on the Viterbi algorithm, whereby the data recorded on the medium 1301 is reproduced.

Further, FIG. 15 shows a conventional information reproduction apparatus that is different from the above-described information reproduction apparatus 1300 in the construction of the timing recovery loop. FIG. 15 is a diagram illustrating the second conventional information reproduction apparatus. The information reproduction apparatus 1500 shown in FIG. 15 is difference from the information reproduction apparatus 1300 shown in FIG. 13 in the construction of the timing recovery loop. In the information reproduction apparatus 1500 shown in FIG. 15, the timing recovery loop is constituted by an ADC 1303, a DEQ 1306, a TR circuit 1307, a D/A converter (DAC) 1502, and a VCO (Voltage Controlled Oscillator) 1503.

The DAC 1502 converts the frequency information outputted from the TR circuit 1307 into an analog voltage. The VCO 1503 outputs a clock of a frequency based on the voltage value outputted from the DAC 1502.

Hereinafter, a description will be given of the timing recovery operation in the timing recovery loop constituted as described above.

The output of the ADC 1303 is equalized by the DEQ 1306 and outputted to the TR circuit 1307. The TR circuit 1307 calculates frequency information comprising a frequency error and a phase error on the basis of the output signal of the DEQ 1306. The DAC 1502 converts the frequency information outputted from the TR circuit 1307 into an analog voltage. The VCO 1503 generates a clock of a frequency based on the output voltage of the DAC 1502. The clock outputted from the VCO 1503 is supplied to the ADC 1303, the DAC 1502, the DEQ 1306, and the TR circuit 1307, and the frequency of the clock outputted from the VCO 1503 is synchronized with the data recording timing onto the medium 1301 by the feedback control.

DISCLOSURE OF THE INVENTION

Problems to be Solved by the Invention

When the sequence of signal processings of the conventional information reproduction apparatus are reconsidered from the viewpoint of the maximum likelihood decoding, the information recorded on the medium 1301 is read as an analog signal, and the analog signal draws various waveforms (sequences) according to the recorded data. The maximum likelihood decoding is the operation of detecting a sequence that is closest to the actually read sequence from among the various sequences that can occur, and decoding the data corresponding to the detected sequence.

Since the analog signal is a temporally continuous signal, it is difficult to calculate the closeness (or likelihood) of the analog signal as it is to the expected sequence. So, in the conventional information reproduction apparatus, the analog signal is sampled by a signal synchronized with the channel clock to facilitate calculation of the likelihood. Further, calculation of the likelihood is also difficult when the amplitude direction is successive, or when there are many values that can be taken. So, in the conventional information reproduction apparatus, a target PR system is determined, and equalization is carried out so as to be suited to the PR system. For example, assuming that the input to the FIR 1309 is synchronized with the channel clock and the PR system is PR(3,4,4,3), since the values that can be taken are only five values of $\{-7,-4,0,4,7\}$, it becomes very easy to calculate the likelihood. Thereby, a compact Viterbi decoder is realized.

As described above, in the conventional method, timing recovery and equalization are carried out to bring the analog signal read from the medium close to the expected sequence, whereby a compact maximum likelihood decoder is realized. However, on the other hand, a complicated circuit for timing recovery and a large-scale circuit for equalization are indispensable, leading to the following problems.

First of all, in the interpolator 1305, when the digital signal that is sampled by the asynchronous clock is interpolated to be pseudo-synchronized with the recorded timing, an interpolation error undesirably occurs. While several methods of interpolation are considered, linear interpolation of two samples can be constituted by a simplest circuit, but the interpolation error is undesirably increased. If interpolation is carried out from plural samples to reduce this error, the circuit scale is undesirably increased. Further, since there is a possibility that noises of various factors are mixed into the input analog signal itself of the ADC 1303, performing interpolation from such signal may cause wrong interpolation due to noises, or emphasis of noises.

Further, in the DEQ 1306, since the high frequency component is amplified by the digital FIR filter, there is a possibility that emphasis of noises may occur also in the DEQ 1306 as in the interpolator 1305. Further, since the DEQ 1306 has the FIR filter construction, latency exists. Since the latency in the timing recovery loop increases the loop delay, stability of the timing recovery operation is undesirably degraded.

Further, in the FIR circuit 1309, the output of the DEQ 1306 is equalized by the digital FIR filter so as to be suited to the target PR system (e.g., PR(3,4,4,3)). Therefore, there is a possibility that emphasis of noises may occur also in the FIR circuit 1309. Further, although the circuit scale of the Viterbi decoder 1310 in the subsequent stage is reduced by the equalization by the FIR circuit 1309, the FIR circuit 1309 itself causes an increase in the circuit scale.

Further, it is necessary for the VCO 1503 according to the second prior art to have fine frequency resolution so that it can follow minute frequency variations, and further, the frequency band of the VCO 1503 must be broad so that the VCO 1503 can respond to variations in the operation speed of the optical disc device. However, since the VCO 1503 is an analog circuit, the area thereof is undesirably increased. Further, since the VCO 1503 is likely to be affected by voltage, temperature, and noise, in order to design a circuit that is resistant to these influences, design man-hours are significantly increased.

The present invention is made to solve the above-mentioned problems and has for its object to provide an information reproduction apparatus that can reduce degradation in qualities of reproduced data and timing due to interpolation errors when performing timing recovery by interpolation, and that can prevent degradation in stability of the system due to an increase in timing recovery loop delay.

Measures to Solve the Problems

An information reproduction apparatus includes a data reading unit for reading a first signal including data information and timing information from an information recording medium, a first clock generation unit for generating a first clock that is not necessarily synchronized with the timing included in the first signal, a data conversion unit for processing the first signal at the timing of the first clock to obtain a second signal, a timing detection unit for obtaining timing error information between the timing included in the first signal and the timing of the first clock, and plural branch metric calculation units for calculating plural branch metrics from the second signal and the timing error information at the timing of the first clock.

In the information reproduction apparatus the data conversion unit includes an analog-to-digital converter for converting an analog signal into a digital signal by the first clock.

The information reproduction apparatus further includes a second clock generation unit for outputting a second clock that is pseudo-synchronized with the timing included in the first signal, and an expected value generation unit for outputting plural expected values based on the timing error information, and data corresponding to a sequence having the highest likelihood with the sequence of the second signal among the sequences of the plural expected values is outputted as reproduced data at the timing of the second clock.

In the information reproduction apparatus, the frequency of the first clock is higher than the frequency of the timing that is included in the first signal.

In the information reproduction apparatus, the first clock generation unit is controlled on the basis of the timing error information so that the frequency of the first clock is always higher than the frequency of the timing included in the first signal.

The information reproduction apparatus further includes a DC component detection unit for detecting DC components of the second signal, and the expected value generation unit corrects the expected values on the basis of the DC components.

In the information reproduction apparatus, the expected value generation unit is provided with expected values of points that are synchronized with timing included in the first signal, and interpolates the expected values on the basis of the timing error information to generate expected values of points that are synchronized with the first clock.

In the information reproduction apparatus, the expected value generation unit is provided with expected values of divisional points that are obtained by dividing the spaces between points that are synchronized with the timing included in the first signal, in the time-axis direction, and selects a specific expected value from among the expected values of the divisional points on the basis of the timing error information outputted from the timing detection unit.

In the information reproduction apparatus, the expected value generation unit adaptively controls expected values to be generated, on the basis of the reproduced data.

The information reproduction apparatus further includes a path metric calculator for calculating path metrics using the branch metrics, on the basis of the second clock.

In the information reproduction apparatus, when plural edges of the first clock exist between edges of the second clock, the branch metric calculation unit calculates branch metrics from the second signals which correspond to the respective edges of the first clock.

In the information reproduction apparatus, when plural edges of the first clock exist between edges of the second clock, the branch metric calculation unit calculates branch metrics from the second signal which corresponds to the edge of the first clock that is closest to the edge of the second clock.

The information reproduction apparatus further includes a disk drive for reading, from an optical disc as the information recording medium, an analog signal that is recorded on the optical disc.

In the information reproduction apparatus, the information recording medium is a DVD disk.

In the information reproduction apparatus, the information recording medium is a Blu-ray disk.

The information reproduction apparatus can be used for both of reproduction of a DVD disk and reproduction of a Blu-ray disk.

In the information reproduction apparatus, the information recording medium is an HD-DVD disk.

An information reproduction method includes a data reading step of reading a first signal including data information and timing information from an information recording medium, a clock generation step of generating a first clock that is not necessarily synchronized with the timing included in the first signal, a data conversion step of processing the first signal at the timing of the first clock to obtain a second signal, a timing detection step of obtaining timing error information between the timing included in the first signal and the timing of the first clocks and plural branch metric calculation steps of calculating plural branch metrics from the second signal and the timing error information at the timing of the first clock.

In the information reproduction method, the data conversion step includes an analog-to-digital conversion step of converting an analog signal into a digital signal by the first clock.

The information reproduction method further includes a second clock generation step of outputting a second clock that is pseudo-synchronized with the timing included in the first signal, and an expected value generation step of outputting plural expected values based on the timing error information, and data corresponding to a sequence having the highest likelihood with the sequence of the second signal among the sequences of the plural expected values is outputted as reproduced data at the timing of the second clock.

In the information reproduction method, the frequency of the first clock is higher than the frequency of the timing included in the first signal.

In the information reproduction method, the frequency of the first clock is changed on the basis of the timing error information so that the frequency of the first clock is always higher than the frequency of the timing included in the first signal.

The information reproduction method further includes a DC component detection step of detecting DC components of the second signal, and the expected value generation step corrects the expected values on the basis of the DC components.

In the information reproduction method, the expected value generation step reads expected values of points that are synchronized with the timing included in the first signal, and interpolates the expected values on the basis of the timing error information to generate expected values of points that are synchronized with the first clock.

In the information reproduction method, the expected value generation step reads expected values of divisional points that are obtained by dividing the spaces between points that are synchronized with the timing included in the first signal, in the time-axis direction, and selects a specific expected value from among the expected values of the divisional points on the basis of the timing error information.

In the information reproduction method, the expected value generation step adaptively controls expected values to be generated, on the basis of the reproduced data.

The information reproduction method further includes a path metric calculation step of calculating path metrics using the branch metrics, on the basis of the second clock.

In the information reproduction method, when plural edges of the first clock exist between edges of the second clock, the branch metric calculation step calculates branch metrics from the second signals which correspond to the respective edges of the first clock.

In the information reproduction method, when plural edges of the first clock exist between edges of the second clock, the branch metric calculation step calculates branch metrics from the second signal which corresponds to the edge of the first clock that is closest to the edge of the second clock.

In the information reproduction method, the information recording medium is a DVD disk.

In the information reproduction method, the information recording medium is a Blu-ray disk.

In the information reproduction method, the information recording medium is an HD-DVD disk.

Effects of the Invention

An information reproduction apparatus includes a data reading unit for reading a first signal including data information and timing information from an information recording medium, a first clock generation unit for generating a first clock that is not necessarily synchronized with the timing included in the first signal, a data conversion unit for processing the first signal at the timing of the first clock to obtain a second signal, a timing detection unit for obtaining timing error information between the timing included in the first signal and the timing of the first clock, and plural branch metric calculation units for calculating plural branch metrics from the second signal and the timing error information at the timing of the first clock. Therefore, it is unnecessary to provide a VCO for generating a clock that is synchronized with the data recording timing, whereby the construction of the clock generator can be simplified, and the area of the clock generator and the design man-hours thereof are reduced. Further, it is possible to prevent the stability of the system from being deteriorated due to an increase in the timing recovery loop delay. Furthermore, it is possible to avoid influences of interpolation errors and noises which are caused by the interpolation process for timing recovery, thereby realizing highly precise data reproduction.

In the information reproduction apparatus, the data conversion unit includes an analog-to-digital converter for converting an analog signal into a digital signal by the first clock. Therefore, it is possible to avoid influences of interpolation errors and noises which are caused by the interpolation process for timing recovery, thereby realizing highly precise data reproduction.

The information reproduction apparatus further includes a second clock generation unit for outputting a second clock that is pseudo-synchronized with the timing included in the first signal, and an expected value generation unit for outputting plural expected values based on the timing error information, and data corresponding to a sequence having the highest likelihood with the sequence of the second signal among the sequences of the plural expected values is outputted as reproduced data at the timing of the second clock. Therefore, it is unnecessary to provide a FIR filter having a large circuit scale, leading to a reduction in the circuit scale as the entirety of the information reproduction apparatus.

In the information reproduction apparatus, the frequency of the first clock is higher than the frequency of the timing that is included in the first signal. Therefore, it is unnecessary to provide a VCO for generating a clock that is synchronized with the data recording timing, whereby the construction of the clock generator can be simplified, and the area of the clock generator and the design man-hours thereof are reduced.

In the information reproduction apparatus, the first clock generation unit is controlled on the basis of the timing error information so that the frequency of the first clock is always higher than the frequency of the timing included in the first signal. Therefore, even when the data reading speed varies between the inner circumference part and the outer circumference part of the medium, stable data reproduction operation can be always carried out.

The information reproduction apparatus further includes a DC component detection unit for detecting DC components of the second signal, and the expected value generation unit corrects the expected values on the basis of the DC components. Therefore, it is possible to input the output of the A/D converter directly to the maximum likelihood sequence detector, whereby maximum likelihood decoding sufficiently utilizing the information in the amplitude direction can be carried out, resulting in highly precise data reproduction.

In the information reproduction apparatus, the expected value generation unit is provided with expected values of points that are synchronized with timing included in the first signal, and interpolates the expected values on the basis of the timing error information to generate expected values of points that are synchronized with the first clock. Therefore, it is possible to avoid influences of interpolation errors and noises that are caused by the interpolation process for timing recovery, whereby highly precise data reproduction can be carried out. Further, since it is unnecessary to provide a FIR filter having a large circuit scale, it is possible to achieve a reduction in the circuit scale as the entirety of the information reproduction apparatus.

In the information reproduction apparatus, the expected value generation unit is provided with expected values of divisional points that are obtained by dividing the spaces between points that are synchronized with the timing included in the first signal, in the time-axis direction, and selects a specific expected value from among the expected values of the divisional points on the basis of the timing error information outputted from the timing detection unit. Therefore, it is not necessary to perform interpolation of the expected values, whereby the circuit operation can be simplified.

In the information reproduction apparatus, the expected value generation unit adaptively controls expected values to be generated, on the basis of the reproduced data. Therefore, even when the signal waveform that is read from the medium is extremely distorted, reproduction of accurate recording data can be carried out.

The information reproduction apparatus further includes a path metric calculator for calculating path metrics using the branch metrics, on the basis of the second clock. Therefore, it is possible to reproduce the data synchronized with the data recording timing by maximum likelihood decoding from the analog reproduction waveform that is sampled by the asynchronous clock.

In the information reproduction apparatus, when plural edges of the first clock exist between edges of the second clock, the branch metric calculation unit calculates branch metrics from the second signals which correspond to the respective edges of the first clock. Therefore, it is possible to reproduce the data synchronized with the data recording timing by maximum likelihood decoding from the analog reproduction waveform that is sampled by the asynchronous clock.

In the information reproduction apparatus, when plural edges of the first clock exist between edges of the second clock, the branch metric calculation unit calculates branch metrics from the second signal which corresponds to the edge of the first clock that is closest to the edge of the second clock. Therefore, it is unnecessary to perform accumulation of the branch metrics, whereby the branch metric calculation process can be simplified.

The information reproduction apparatus further includes a disk drive for reading, from an optical disc as the information recording medium, an analog signal that is recorded on the optical disc. Therefore, the data written in the optical disc can be reproduced with high precision.

In the information reproduction apparatus, the information recording medium is a DVD disk. Therefore, the data written in the DVD can be reproduced with high precision.

In the information reproduction apparatus, the information recording medium is a Blu-ray disk. Therefore, the data written in the Blu-ray disk can be reproduced with high precision.

The information reproduction apparatus can be used for both of reproduction of a DVD disk and reproduction of a Blu-ray disk. Therefore, highly precise data reproduction can be carried out in both of the DVD reproduction and the Blu-ray disc reproduction.

In the information reproduction apparatus, the information recording medium is an HD-DVD disk. Therefore, the data written in the HD-DVD disk can be reproduced with high precision.

An information reproduction method includes a data reading step of reading a first signal including data information and timing information from an information recording medium, a clock generation step of generating a first clock that is not necessarily synchronized with the timing included in the first signal, a data conversion step of processing the first signal as at the timing of the first clock to obtain a second signal, a timing detection step of obtaining timing error information between the timing included in the first signal and the timing of the first clock, and plural branch metric calculation steps of calculating plural branch metrics from the second signal and the timing error information at the timing of the first clock. Therefore, it is unnecessary to provide a VCO for generating a clock that is synchronized with the data recording timing, whereby the construction of the clock generator can be simplified, and the area of the clock generator and the design man-hours thereof are reduced. Further, it is possible to prevent the stability of the system from being deteriorated due to an increase in the timing recovery loop delay. Furthermore, it is possible to avoid influences of interpolation errors and noises which are caused by the interpolation process for timing recovery, thereby realizing highly precise data reproduction.

In the information reproduction method, the data conversion step includes an analog-to-digital conversion step of converting an analog signal into a digital signal by the first clock. Therefore, it is possible to avoid influences of interpolation errors and noises which are caused by the interpolation process for timing recovery, thereby realizing highly precise data reproduction.

The information reproduction method further includes a second clock generation step of outputting a second clock that is pseudo-synchronized with the timing included in the first signal, and an expected value generation step of outputting plural expected values based on the timing error information, and data corresponding to a sequence having the highest likelihood with the sequence of the second signal among the sequences of the plural expected values is outputted as reproduced data at the timing of the second clock. Therefore, it is unnecessary to provide a FIR filter having a large circuit scale, leading to a reduction in the circuit scale as the entirety of the information reproduction apparatus.

In the information reproduction method, the frequency of the first clock is higher than the frequency of the timing included in the first signal. Therefore, it is unnecessary to provide a VCO for generating a clock that is synchronized with the data recording timing, whereby the construction of the clock generator can be simplified, and the area of the clock generator and the design man-hours thereof are reduced.

In the information reproduction method, the frequency of the first clock is changed on the basis of the timing error information so that the frequency of the first clock is always higher than the frequency of the timing included in the first signal. Therefore, even when the data reading speed varies between the inner circumference part and the outer circumference part of the medium, stable data reproduction operation can be carried out.

The information reproduction method further includes a DC component detection step of detecting DC components of the second signal, and the expected value generation step corrects the expected values on the basis of the DC components. Therefore, it is possible to input the output of the A/D converter directly to the maximum likelihood sequence detector, whereby maximum likelihood decoding sufficiently utilizing the information in the amplitude direction can be carried out, resulting in highly precise data reproduction.

In the information reproduction method, the expected value generation step reads expected values of points that are synchronized with the timing included in the first signal, and interpolates the expected values on the basis of the timing error information to generate expected values of points that are synchronized with the first clock. Therefore, it is possible to avoid influences of interpolation errors and noises that are caused by the interpolation process for timing recovery, whereby highly precise data reproduction can be carried out. Further, since it is unnecessary to provide a FIR filter having a large circuit scale, it is possible to achieve a reduction in the circuit scale as the entirety of the information reproduction apparatus.

In the information reproduction method, the expected value generation step reads expected values of divisional points that are obtained by dividing the spaces between points that are synchronized with the timing included in the first signal, in the time-axis direction, and selects a specific expected value from among the expected values of the divisional points on the basis of the timing error information. Therefore, it is not necessary to perform interpolation of the expected values, whereby the circuit operation can be simplified.

In the information reproduction method, the expected value generation step adaptively controls expected values to be generated, on the basis of the reproduced data. Therefore, even when the signal waveform that is read from the medium is extremely distorted, reproduction of accurate recording data can be carried out.

The information reproduction method further includes—a path metric calculation step of calculating path metrics using the branch metrics, on the basis of the second clock. Therefore, it is possible to reproduce the data synchronized with the data recording timing by maximum likelihood decoding from the analog reproduction waveform that is sampled by the asynchronous clock.

In the information reproduction method, when plural edges of the first clock exist between edges of the second clock, the branch metric calculation step calculates branch metrics from the second signals which correspond to the respective edges of the first clock. Therefore, it is possible to reproduce the data synchronized with the data recording timing by maximum likelihood decoding from the analog reproduction waveform that is sampled by the asynchronous clock.

In the information reproduction method, when plural edges of the first clock exist between edges of the second clock, the branch metric calculation step calculates branch metrics from the second signal which corresponds to the edge of the first clock that is closest to the edge of the second clock. Therefore, it is unnecessary to perform accumulation of the branch metrics, whereby the branch metric calculation process can be simplified.

In the information reproduction method, the information recording medium is a DVD disk. Therefore, the data written in the DVD can be reproduced with high precision.

In the information reproduction method, the information recording medium is a Blu-ray disk. Therefore, the data written in the Blu-ray disk can be reproduced with high precision.

In the information reproduction method, the information recording medium is an HD-DVD disk. Therefore, the data written in the HD-DVD disk can be reproduced with high precision.

BRIEF DESCRIPTION OF THE DRAWINGS

FIG. 1(b) is a diagram for explaining the operation of the information reproduction apparatus according to the first embodiment of the present invention.

FIG. 4 is a diagram for explaining the operation of an expected value generator.

FIG. 6 is a timing chart for explaining the operation of the maximum likelihood decoder.

FIG. 7 is a diagram illustrating the construction of an information reproduction apparatus according to a second embodiment of the present invention.

FIG. 8 is a diagram for explaining the operation of a baseline control circuit.

Figure 1A:
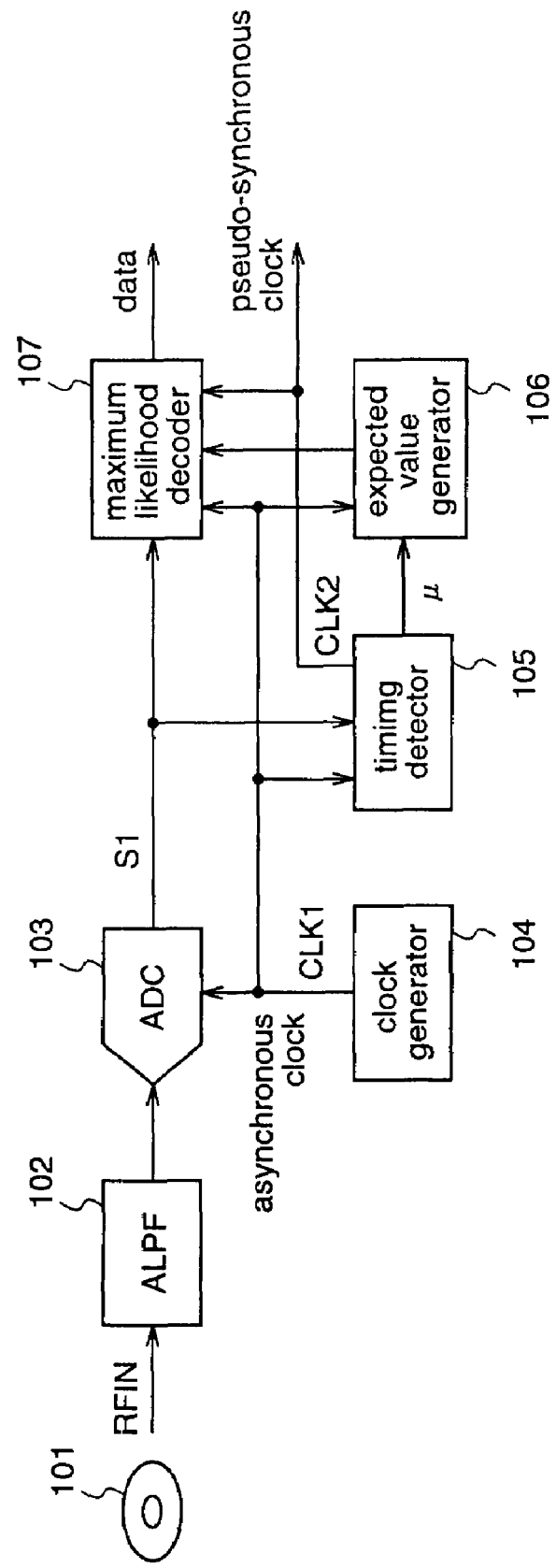
FIG. 1(a) is a diagram illustrating the construction of an information reproduction apparatus according to a first embodiment of the present invention.

DESCRIPTION OF THE REFERENCE NUMERALS 100, 700, 900, 1000, 1100 . . . information reproduction apparatus
101,1301 . . . medium
102,1302 . . . ALPF
103,1303 . . . A/D converter
104 . . . clock generator
105 . . . timing detector
106 . . . expected value generator
107 . . . maximum likelihood decoder
201 . . . SYNC mark detector
202 . . . counter
203 . . . calculated value holding unit
204 . . . divider
205 . . . phase comparator
206 . . . NCO control value calculator
207 . . . NCO circuit
208 . . . pseudo-synchronous clock generator
5a1~5an . . . calculator
502 . . . ACS circuit
503 . . . survival path management circuit
901 . . . baseline control circuit (BC)
1304 . . . frequency synthesizer
1305 . . . interpolator
1306 . . . DEQ
1307 . . . TR circuit
1309 . . . FIR
1310 . . . Viterbi decoder
1502 . . . DAC
1503 . . . VCO
CLK1 . . . asynchronous clock
CLK2 . . . synchronous clock

BEST MODE TO EXECUTE THE INVENTION

The fundamental principle of the present invention is not to bring an analog signal that is read from a medium close to an expected sequence but to bring the expected sequence close to the analog signal, conversely.

Hereinafter, embodiments of the present invention will be described.

Embodiment 1

FIG. 1(a) is a diagram for explaining an information reproduction apparatus according to a first embodiment of the present invention.

The information reproduction apparatus 100 according to the first embodiment reproduces data and timing from an analog signal comprising data information and timing information, which analog signal is recorded on a medium 101 such as a DVD, and the apparatus 100 comprises an ALPF (Analog Low Pass Filter) 102, an A/D converter (ADC) 103, a clock generator 104, a timing detector 105, an expected value generator 106, and a maximum likelihood decoder 107.

Figure 13:
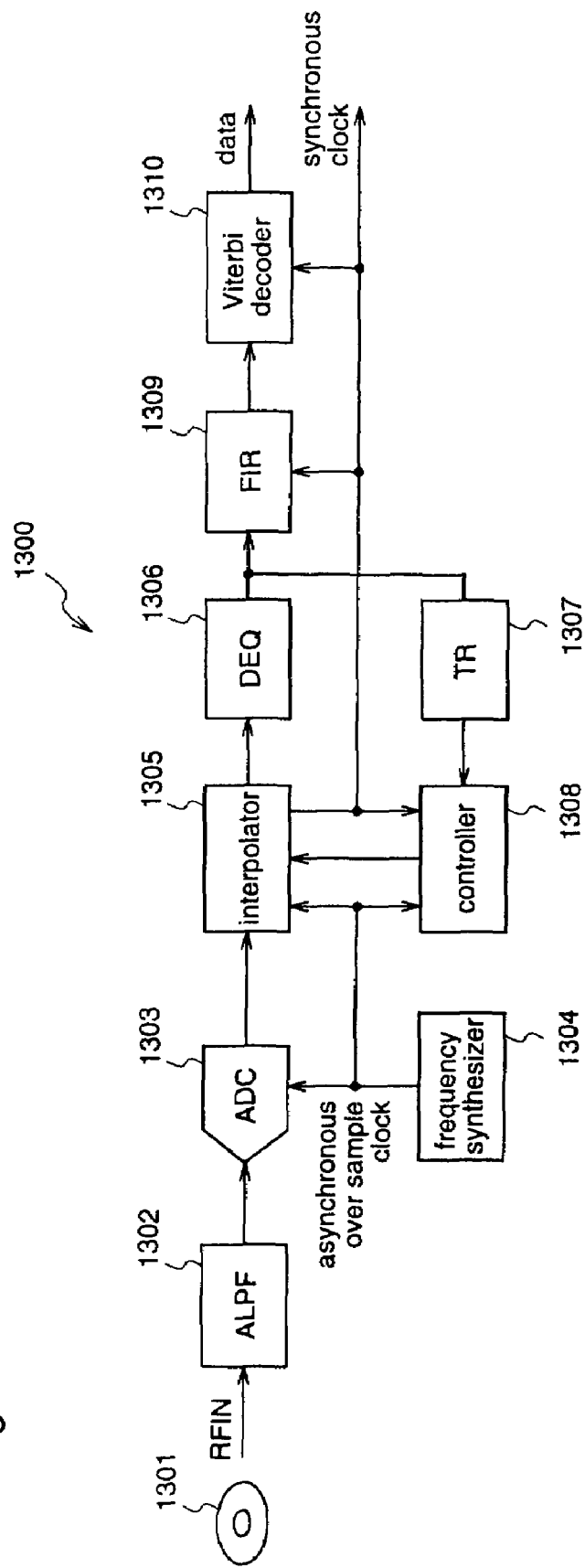
FIG. 13 is a diagram illustrating the construction of the conventional information reproduction apparatus.

The ALPF 102 and the ADC 103 are identical to those of the conventional information reproduction apparatus 1300 shown in FIG. 13. The clock generator 104 generates a clock CLK1 of a fixed frequency, and supplies the generated clock to the ADC 103, the timing detector 105, the expected value generator 106, and the maximum likelihood decoder 107. The frequency of the clock generated by the clock generator 104 is not necessarily synchronized with a clock that is synchronized with the data recording timing to the medium 101, i.e., the channel clock, and an asynchronous fixed-frequency over sample clock (hereinafter referred to as "asynchronous clock") having a sufficient margin is adopted in this first embodiment.

The timing detector 105 generates a pseudo synchronous clock CLK2 that is pseudo-synchronized with the channel clock, and generates a parameter μ for interpolating expected values.

The expected value generator 106 generates expected values to be used in the maximum likelihood decoder 107.

The maximum likelihood decoder 107 generates reproduced data on the basis of the expected values and an output S1 of the ADC 103.

Next, a description will be given of the outline of the operation of the information reproduction apparatus 100 according to the first embodiment.

FIG. 1(b) is a diagram for explaining the operation of the information reproduction apparatus 100.

When the operation of the information reproduction apparatus 100 is started, the data information and the timing information recorded on the medium 101 (DVD) are read as an analog signal by an optical pickup (step 101), and an asynchronous clock CLK1 is generated by the clock generator 104 (step 102).

The amplitude and offset of the analog signal that is read from the medium 101 are adjusted by a VGA and an offset adjuster (both not shown), respectively, and then high frequency components are removed from the analog signal by the ALPF 102, and thereafter, the analog signal is converted into a digital signal by the ADC 103 (step 103).

The ADC output S1 and the asynchronous clock CLK1 are respectively inputted to the timing detector 105, and the timing detector 105 generates a pseudo synchronous clock CLK2 that is pseudo-synchronized with the channel clock, and a parameter 4 for interpolating the expected values (step 104).

The expected value generator 106 interpolates the expected values of default that have previously been set, on the basis of the parameter μ, to generate expected values of the maximum likelihood decoder 107, and outputs the expected values to the maximum likelihood decoder 107 (step 105).

In the maximum likelihood decoder 107, branch metrics are calculated from the ADC output S1 and the expected values of the ADC output S1 which are outputted from the expected value generator 106, at the timing of the asynchronous clock CLK1, and pass metrics are calculated using the branch metrics at the timing of the pseudo synchronous clock CLK2, whereby data to be reproduced are calculated and outputted (step 106).

Hereinafter, a description will be given of the specific constructions of the timing detector 105, the expected value generator 106, and the maximum likelihood decoder 107, and the details of steps 104 to 106 which are executed by the respective constituents.

1) Initially, the construction of the timing detector 105, and the detail of step 104 that is executed by the timing detector 105 will be described.

Figure 2:
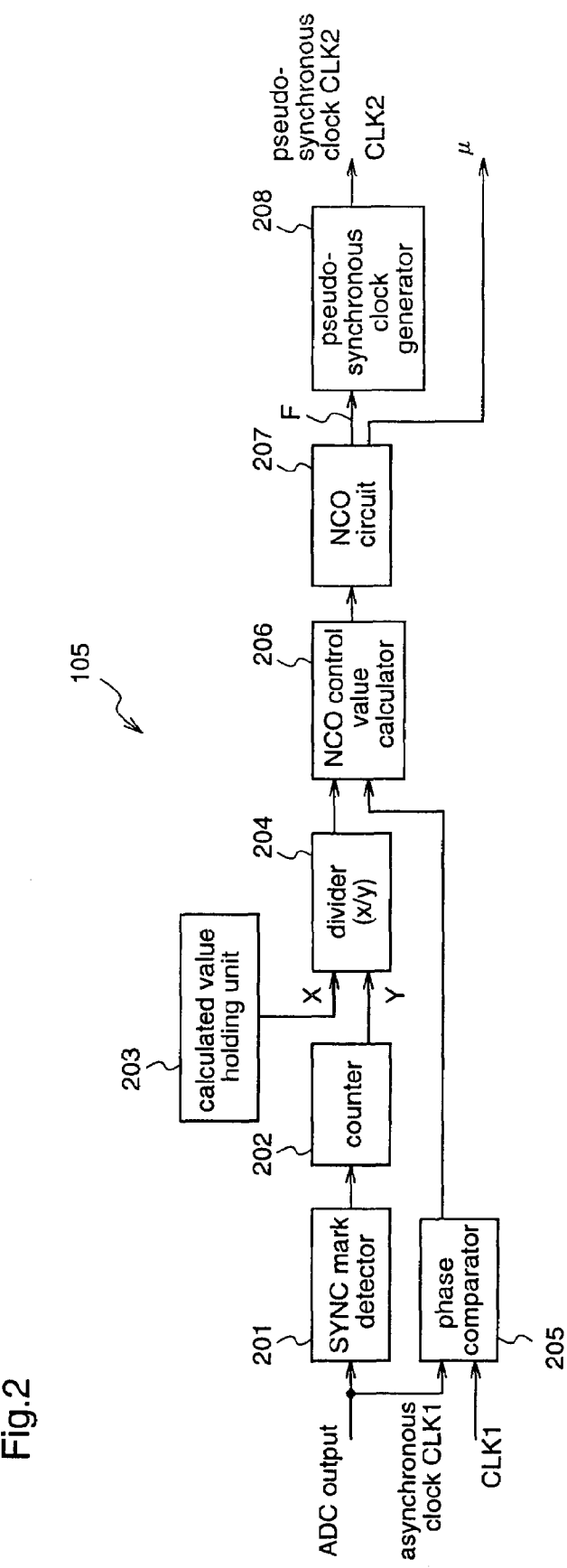
FIG. 2 is a diagram illustrating the construction of a timing detector.

FIG. 2 is a block diagram illustrating the specific construction of the timing detector 105.

The timing detector 105 comprises a SYNC mark detector 201, a counter 202, a calculated value holding unit 203, a divider 204, a phase comparator 205, an NCO control value calculator 206, an NCO circuit 207, and a pseudo synchronous clock generator 208.

The SYNC mark detector 201 detects SYNC marks from the ADC output S1. The counter 202 counts the SYNC mark intervals by the asynchronous clock CLK1, and outputs a count value Y. The calculated value holding unit 203 holds a reference calculation value X for determining a ratio between the channel clock and the asynchronous clock CLK 1. The reference calculation value X is a value unique to the medium 101. For example, when the medium 101 is a DVD, the value of X is 1488 that is the SYNC mark interval. The divider 204 calculates a ratio X/Y between the channel clock and the asynchronous clock CLK1. The phase comparator 205 obtains a phase error between the ADC output S1 and the asynchronous clock CLK1. The NCO control value calculator 206 calculates a NC word (NCO control word) that is a control value for controlling the NCO circuit 207. The pseudo synchronous clock generator 208 generates a pseudo synchronous clock CLK2 that is pseudo-synchronized with the channel clock.

Next, the detail of step 104 executed by the timing detector 105 will be described.

Figure 14:
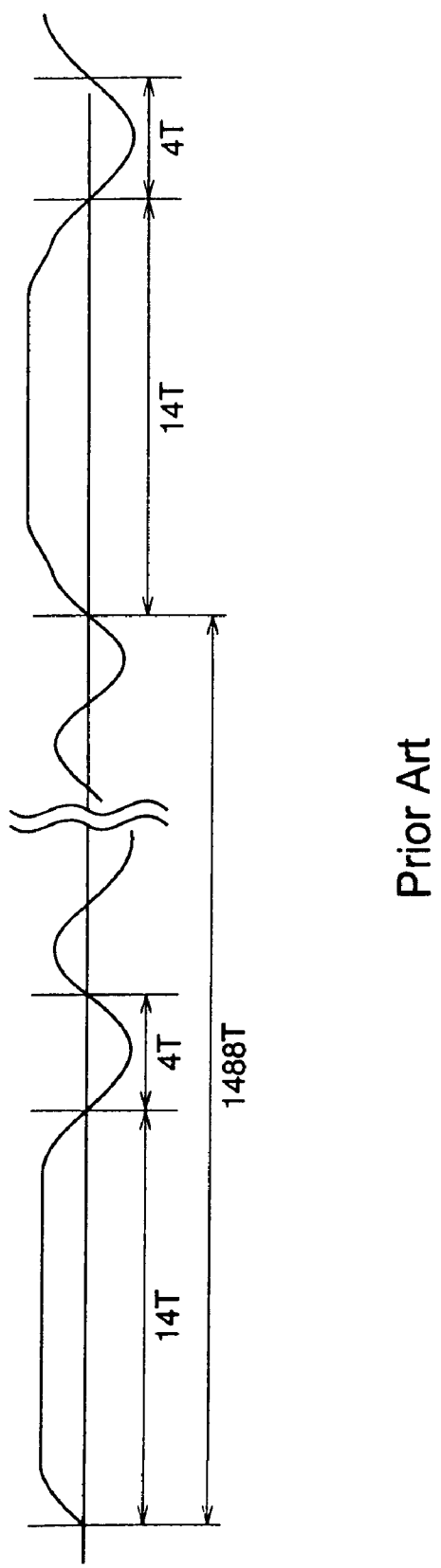
FIG. 14 is a diagram for explaining SYNC marks.
Figure 15:
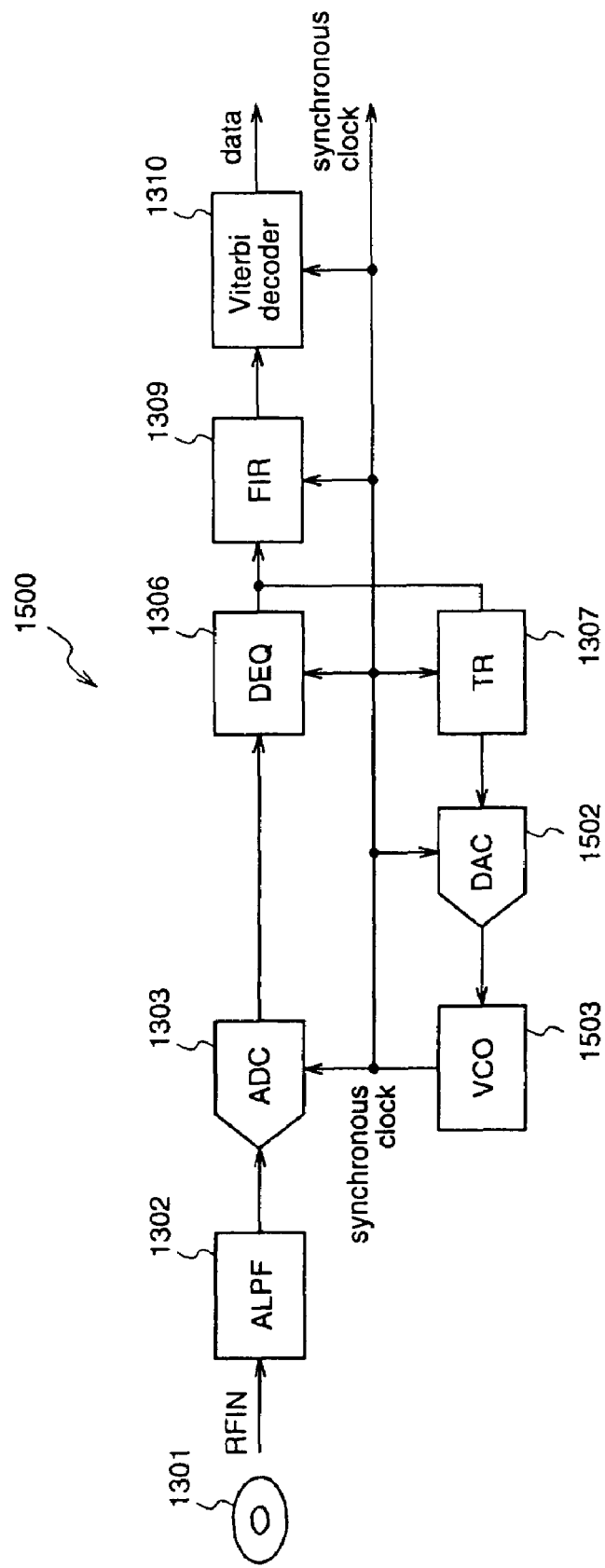
FIG. 15 is a diagram illustrating the construction of the conventional information reproduction apparatus.

The SYNC mark detector 201 detects SYNC marks from the output of the ADC 103. When the medium 101 is a DVD, the frequency of the channel clock can be detected by detecting the SYNC marks as described above. As shown in FIG. 14, a SYNC mark is a specific pattern comprising a period of 14T and a period of 4T. Here, T indicates the channel period. The SYNC marks are recorded on the medium so as to appear at 1488T intervals.

The counter 202 counts the SYNC mark intervals by the asynchronous clock CLK1, and outputs the count value to the divider 204. The divider 204 divides the calculation value X that is stored in the calculated value holding unit 203 with the counter value Y that is an output of the counter 202 to determine a radio between the channel clock and the asynchronous clock CLK1, and outputs the ratio to the NCO control value calculator 206. For example, assuming that the channel clock is 27 MHz and the synthesizer clock is 54 MHz, the output value of the divider 204 becomes 0.5. Further, the phase comparator 205 obtains a phase error between the ADC output S1 and the asynchronous clock CLK1 on the basis of the output of the ADC 103 and the asynchronous clock CLK1, and outputs the phase error to the NCO control value calculator 206. The NCO control value calculator 206 corrects the output value of the divider 204 on the basis of the output of the phase comparator 205 to calculate a NC word. The NCO circuit 207 subtracts the value of the NC word from the initial value 1 for each one clock of the asynchronous clock CLK 1, and repeats the subtraction between "1" and "0" while performing control so that the resultant value does not become smaller than 0.

Figure 3:
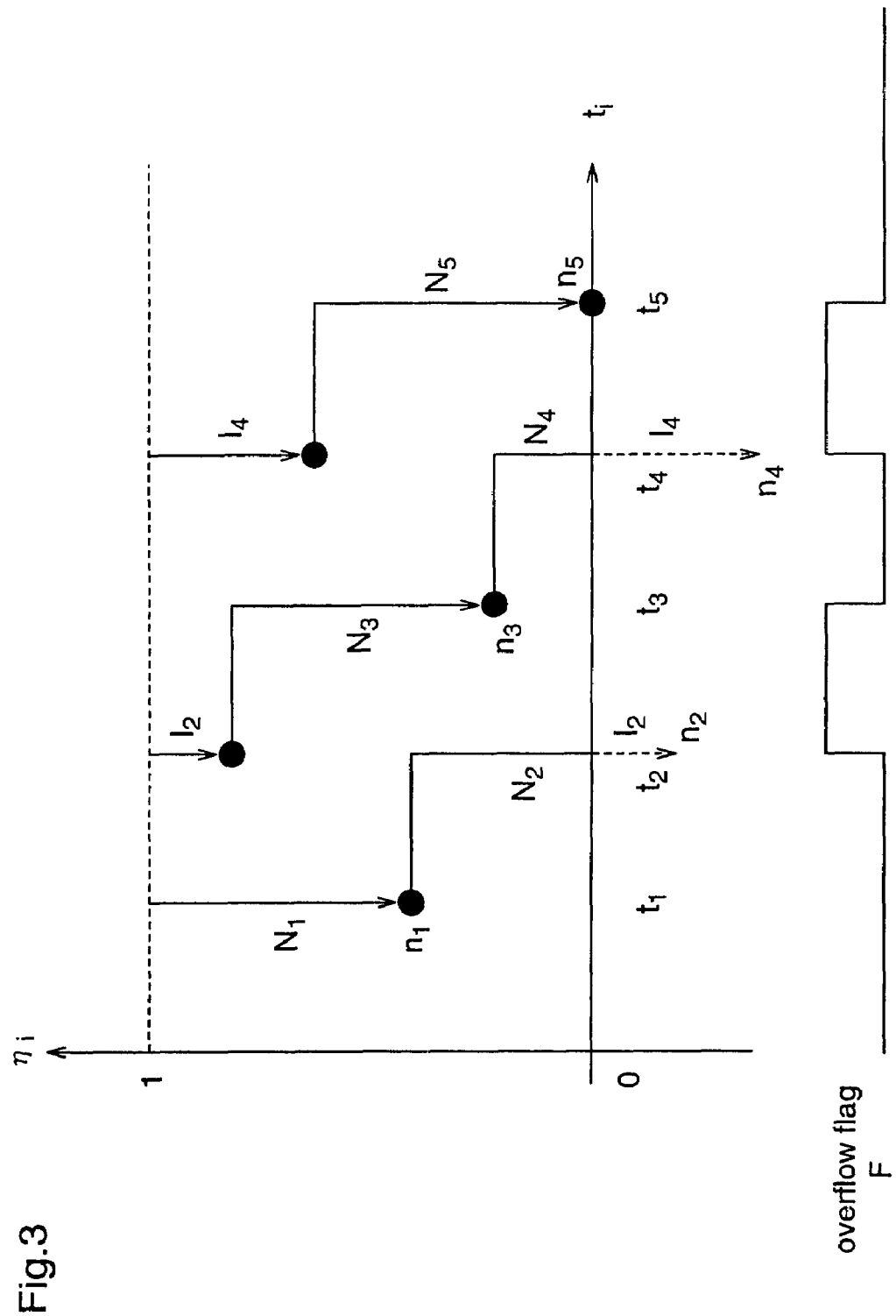
FIG. 3 is a schematic diagram for explaining the operation of an NCO circuit.

Hereinafter, the operation of the NCO circuit 207 will be described with reference to FIG. 3. FIG. 3 is a diagram for explaining the operation of the NCO circuit 207.

In FIG. 3, t1~t5 indicate the asynchronous clock CLK1 timings, N1~N5 indicate the values of the NC word at t1~t5, n1~n5 indicate the subtraction values at t1~t5, and 12 and 14 indicate the redundancy values obtained when n1~n5 are smaller than 0. Further, overflow flag F indicates the output timing of an overflow flag F.

Initially, at t1, N1 is subtracted from the initial value 1 to calculate n1. Next, at t2, N2 is subtracted from n1 to calculate n2. At this time, since n2 is smaller than 0, the NCO circuit 207 outputs an overflow flag F, and moves up the value of 12 that is smaller than 0. At t3, N3 is subtracted from (1-12) to calculate n3. Since n3 is larger than 0, no overflow flag F is outputted, and the subtraction value is not moved up. At t4, N4 is subtracted from n3 to calculate n4. At this time, since the value of n4 is smaller than 0 like t2, an overflow flag F is outputted, and 14 is moved up. At t5, N5 is subtracted from (1-14) to calculate n5. The above-mentioned operation can be expressed by the following formula (2).

$$\eta_i = (\eta_{i-1} - N_i) \bmod 1 \qquad (2)$$

The NCO circuit 207 outputs the overflow flag F to the pseudo-synchronous clock generator 208 by the above-mentioned operation. Further, the NCO circuit 207 calculates a value of the parameter μ that is a timing error between the channel clock and the asynchronous clock CLK1, the following formula (3), $$\mu_i = 1 - \eta_i \qquad (3)$$

and outputs the value to the expected value generator 106.

The pseudo-synchronous clock generator 208 removes the clocks with no overflow flags F from the asynchronous clock CLK1 outputted from the clock generator 104 to output the pseudo-synchronous clock CLK2 that is pseudo-synchronized with the channel bit, whereby the above-mentioned step 104 is completed.

2) Next, the detail of step 105 executed by the expected value generator 106 will be described.

FIG. 4 is a diagram for explaining the operation of the expected value generator 106.

It is assumed that the data recorded on the medium 101 is {011110001}. When timing interpolation and equalization are carried out in the conventional information reproduction apparatus 1300 or 1500, since the sample points are synchronized with the channel clock and are completely equalized to the PR(3,4,4,3), the expected value sequence becomes {-4, 0,4,7,4,0,-4,-4,0,4} as shown in FIG. 4(a). That is, only five values of {-7,-4,0,4,7} can be taken as the expected values. In the system of the present invention, however, even when the sample points are completely equalized to the PR(3,4,4,3), the sample points are not synchronized with the channel clock, the expected values does not fall within five values. For example, when the asynchronous clock outputted from the clock generator 104 is over-sampled to 4/3 times as compared with the channel clock, the value of the NC word that is calculated by the NCO control value calculator 206 of the timing detector 105 is 0.75, and the values of the parameter μ outputted from the NCO circuit 207 form a sequence of {0,0.75,0.5,0.25,0,0.75,0.5,0.25,0,0.75,0.5,0.25,0}. In the expected value generator 106, the expected values of default that have previously been set, for example, {-7,-4,0,4,7} in this first embodiment, are interpolated with the values of the parameter μ, thereby generating the expected values of the ADC output S1. FIG. 4(b) shows a sequence of the expected values generated by the expected value generator 106.

Here, the first expected value is obtained by the following formula (4), $$(1-\mu)\times(-4)+\mu\times 0 \qquad (4)$$

and the value becomes -4 because μ is 0. The next expected value is also obtained by formula (4), and the value becomes -1 because μ is 0.75. As the result, the expected value generator 106 outputs the expected values as shown in FIG. 4(b), whereby the above-described step 105 is completed.

3) Next, the construction of the maximum likelihood decoder 107, and the detail of step 106 executed by the maximum likelihood decoder 107 will be described.

The maximum likelihood decoder 107 generates reproduced data on the basis of the expected value outputted from the expected value generator 106, and the ADC output S1. Since the ADC output S1 is sampled by the asynchronous clock CLK1, the sample points thereof are not necessarily synchronized with the synchronous points of the channel clock, and there is a possibility that two sample points exist between the edges of the channel clock. In order to perform transfer from the asynchronous data to the synchronous data, the maximum likelihood decoder 107 calculates branch metrics with the asynchronous clock CLK1, and adds, compares, and selects the branch metrics with the pseudo-synchronous clock CLK2, thereby calculating a path metric.

Figure 5:
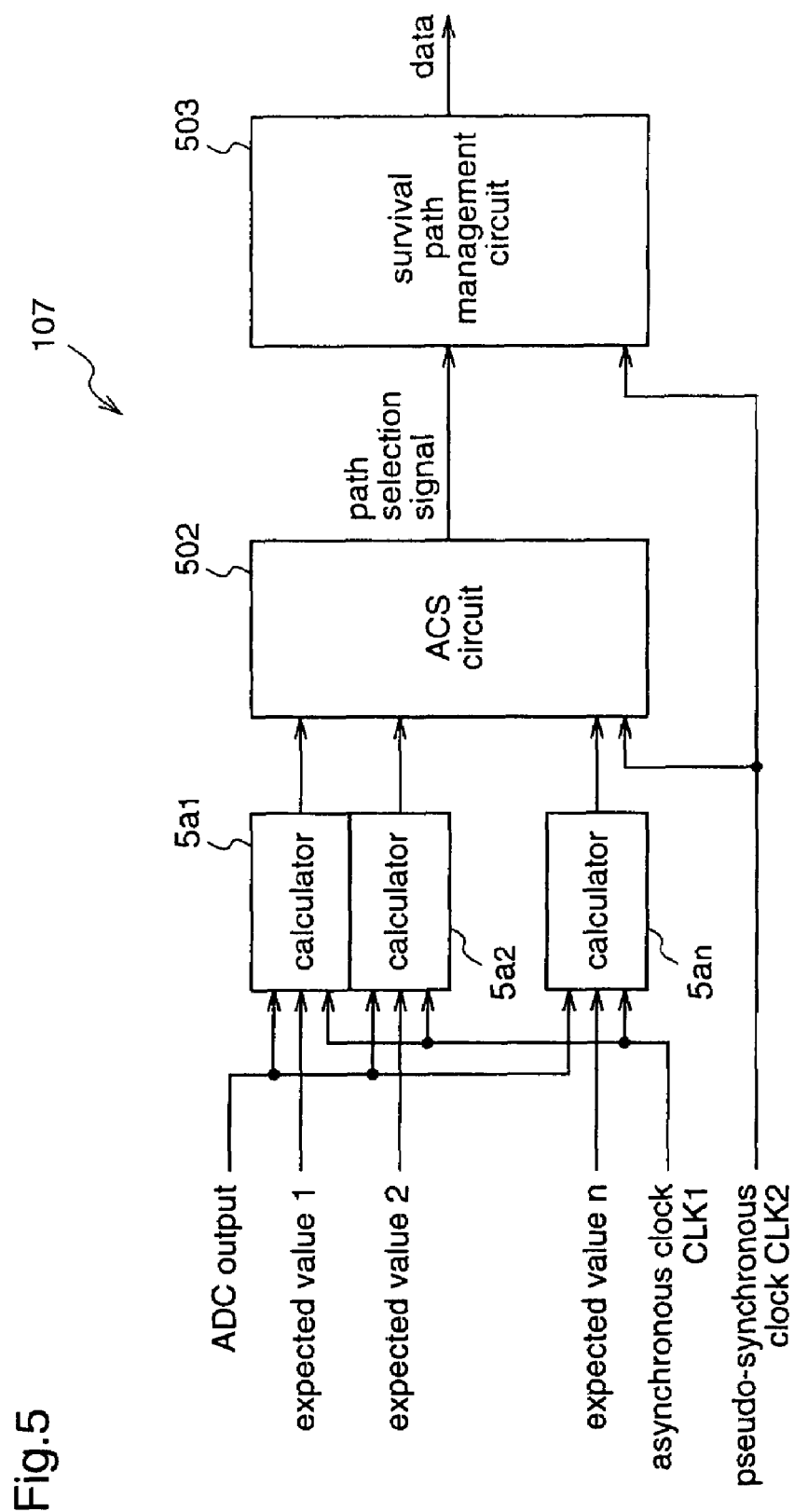
FIG. 5 is a diagram illustrating the construction of a maximum likelihood decoder.

FIG. 5 is a block diagram illustrating the construction of the maximum likelihood decoder 107.

The maximum likelihood decoder 107 includes calculation units 5a1 to 5an, an ACS (Add-Compare-Select) circuit 502, and a survival path management circuit 503.

The calculation units 5a1 to 5an calculate branch metrics from the ADC output S1 and the expected values thereof, by the asynchronous clock CLK1. The ACS circuit 502 adds, compares, and selects the branch metrics outputted from the calculation units 5a1~5an, and holds a metric value of the highest likelihood as a path metric value. The survival path management unit 503 receives the output of the ACS circuit 502 and the output of the clock generator 208, and outputs final reproduced data. The ACS circuit 502 and the survival path management unit 503 are operated by the pseudo-synchronous clock CLK2.

Next, a description will be given of the detail of step 106 that is executed by the maximum likelihood decoder 107.

FIGS. 6(a)-6(h) are timing charts for explaining the operation of the maximum likelihood decoder 107. FIG. 6(a) shows the data recorded on the medium 101. FIG. 6(b) shows the clock synchronized with the data, i.e., the channel clock. FIG. 6(c) shows the reproduced analog signal that is read from the medium 101. FIG. 6(d) shows the asynchronous clock CLK1 outputted from the clock generator 104. FIG. 6(e) shows the pseudo-synchronous clock CLK2 outputted from the pseudo-synchronous clock generator 208. FIG. 6(f) shows the output of the ADC 103. FIG. 6(g) shows the branch metrics calculated by the calculation units 5a1 to 5an. FIG. 6(h) shows the output of the path selection signal from the ACS 502. Further, t1 to tn show the synchronous points of the channel clock, and t'1 to t'n show the pseudo-synchronous points.

At t1, the respective calculation units 5a1 to 5an obtain branch metrics $g1_1$ to $g1_n$ from the ADC output f1 and the expected values generated by the expected value generator 106. In FIG. 6, these branch metrics are collectively shown as g1. Since the respective calculation units 5a1 to 5an receive the next ADC output f2 before the timing t'2 at which the ACS 502 receives the pseudo synchronous clock CLK2, the calculation units 5a1 to 5an obtain branch metrics g2 from the ADC output f2 and the expected value thereof, and accumulate the branch metrics g1 and g2.

At t'2, when the ACS 502 receives the pseudo synchronous clock CLK2, the calculation units 5a1~5an output the branch metrics to the ACS 502, and reset the calculated values (accumulated values). The ACS circuit 502 adds, compares, and selects the branch metrics outputted from the calculation units 5a1~5an to hold a metric value of the highest likelihood as a path metric value, and simultaneously, outputs a path selection signal h1 indicating which path is selected.

Since the calculation units 5a1~5an receive the ADC outputs f3 and f4 during a period from t'2 to t'3, the calculation units 5a1~5an calculate branch metrics g3 from the ADC output f3 and the expected value thereof, and further, calculate branch metrics g4 from the ADC output f4 and the expected value thereof, and then accumulate these branch metrics. At t'3, when the ACS circuit 502 receives the pseudo synchronous clock CLK2, the calculation units 5a1~5an output the branch metrics, and reset the calculated values. The ACS circuit 502 stores a path metric value, and outputs a path selection signal h2.

After t'3, the calculation units 5a1~5an receive the ADC output f5, and calculate branch metrics g5. Since the calculation units 5a1~5an do not receive the ADC output d until t'4 at which the ACS circuit 502 receives the pseudo synchronous clock CLK2, the calculation units 5a1~5an output the branch metrics g5 at t'3, and reset the values thereof. The ACS circuit 502 stores a path metric value, and outputs a path selection signal h3. The same operation as mentioned above is carried out for t'4 and subsequent synchronous points.

In the survival path management circuit 503, final reproduced data is generated on the basis of the path selection signal outputted from the ACS circuit 502, and the above-mentioned step 106 is completed when the reproduced data is outputted, whereby the operation of reproducing the data recorded on the medium 101 by the information reproduction apparatus 100 of the first embodiment is completed.

As described above, according to the first embodiment, since timing recovery is carried out by interpolating the expected values that can be previously analogized and are not affected by noises, performance degradation due to interpolation errors can be minimized, whereby the precisions of data reproduction and timing recovery can be enhanced. Further, since the feedforward type timing recovery method is employed, the stability of the system is prevented from being degraded due to an increase in the loop delay.

In this first embodiment, the expected value generator 106 interpolates the expected values of the synchronous points which are synchronized with the channel clock timings that have previously been set. However, the expected value generator 106 may divide the period between the synchronous points in the expected value sequence into a predetermined number of parts in the time axis direction, and previously store the expected values of the divisional points in a memory or the like, and then select the expected value of the divisional point that is closest to the value of the above-described μ. In this case, the interpolation can be dispensed with, whereby the circuit operation can be simplified.

Further, in this first embodiment, when plural sample points that are sampled with the asynchronous clock exist between the synchronous clocks, the calculation units 5a1~5an of the maximum likelihood decoder 107 accumulate and add the branch metrics that are calculated for the respective sample points. However, the calculation units 5a1~5an may calculate branch metrics from the ADC output S1 and the expected value thereof, which corresponds to an edge of the asynchronous clock CLK1 that is closest to the edge of the channel clock, and output the branch metrics to the ACS circuit 502. In this case, it is not necessary to accumulate the branch metrics, whereby the circuit operation can be simplified.

Embodiment 2

According to a second embodiment of the present invention, in the information reproduction apparatus according to the first embodiment, the frequency of the clock outputted from the clock generator 104 is switched by control of the timing detector 105.

For example, when a DVD is used as the medium 101, although a CLV (Constant Linear Velocity) method is usually adopted as a rotation control method for a DVD-ROM, a CAV (Constant Angular Velocity) method is sometimes adopted because it becomes difficult to control rotation of a spindle motor during high speed playback. In the CAV method, since the recording frequency is higher in the outer circumference part of the medium 101 than in the inner circumference part thereof, even if the frequency of the clock outputted from the clock generator 104 is higher than the recording frequency in the inner circumference part of the medium 101, the relationship can be reversed in the outer circumference part of the medium 101. Usually, the circuit construction can be simplified when the frequency of the asynchronous clock outputted from the clock generator 104 is higher, and therefore, in this second embodiment, the frequency of the clock outputted from the clock generator 104 is switched on the basis of the timing detection signal outputted from the timing detector 105.

FIG. 7 is a block diagram illustrating the construction of the information reproduction apparatus 700 according to the second embodiment of the invention. In FIG. 7, the same reference numerals are used for the same constituents as those shown in FIG. 1, and descriptions thereof will be omitted.

The second embodiment is different from the first embodiment in that the timing detector 105 outputs, to the clock generator 104, a control signal S2 which instructs switching of the frequency of the asynchronous clock CLK1 outputted from the clock generator 104, and that the clock generator 104 is constituted so as to output plural-stages of frequencies selectively.

Next, a description will be given of control of the clock generator 104 by the timing detector 105.

The timing detector 105 receives the output of the ADC 103 and the output of the clock generator 104, and obtains a ratio X/Y between the channel clock and the asynchronous clock CLK1 outputted from the clock generator 104 by the divider 204 that is provided in the timing detector 105. Since the asynchronous clock CLK1 is faster than the channel clock, X<Y is obtained.

A control signal generation circuit (not shown) detects the ratio X/Y, and outputs a control signal S2 to the clock generator 104 when the ratio X/Y comes near to be reversed. The clock generator 104 receives the control signal S2, and switches the asynchronous clock CLK1 to be outputted to a clock of a frequency that is a predetermined number of times as high as the fundamental frequency. For example, by dividing the generated frequency, a clock of a frequency that is twice, or four times, or eight times as high as the fundamental frequency is outputted.

As described above, according to the second embodiment, the timing detector 105 controls the frequency of the clock outputted from the clock generator 104, on the basis of the ratio between the channel clock and the asynchronous clock CLK1 outputted from the clock generator 104. Therefore, the clock frequency outputted from the clock generator 104 can be always controlled to be higher than the channel clock, whereby stable data reproducing operation can be carried out even when the recording frequency is higher in the inner circumference part of the medium 101 than in the outer circumference part thereof.

Embodiment 3

According to a third embodiment, in the information reproduction apparatus according to the first embodiment, the expected values outputted from the expected value generator 106 are corrected on the basis of the output of a baseline controller (BC) that detects a DC component and performs level control for the DC component.

Figure 9:
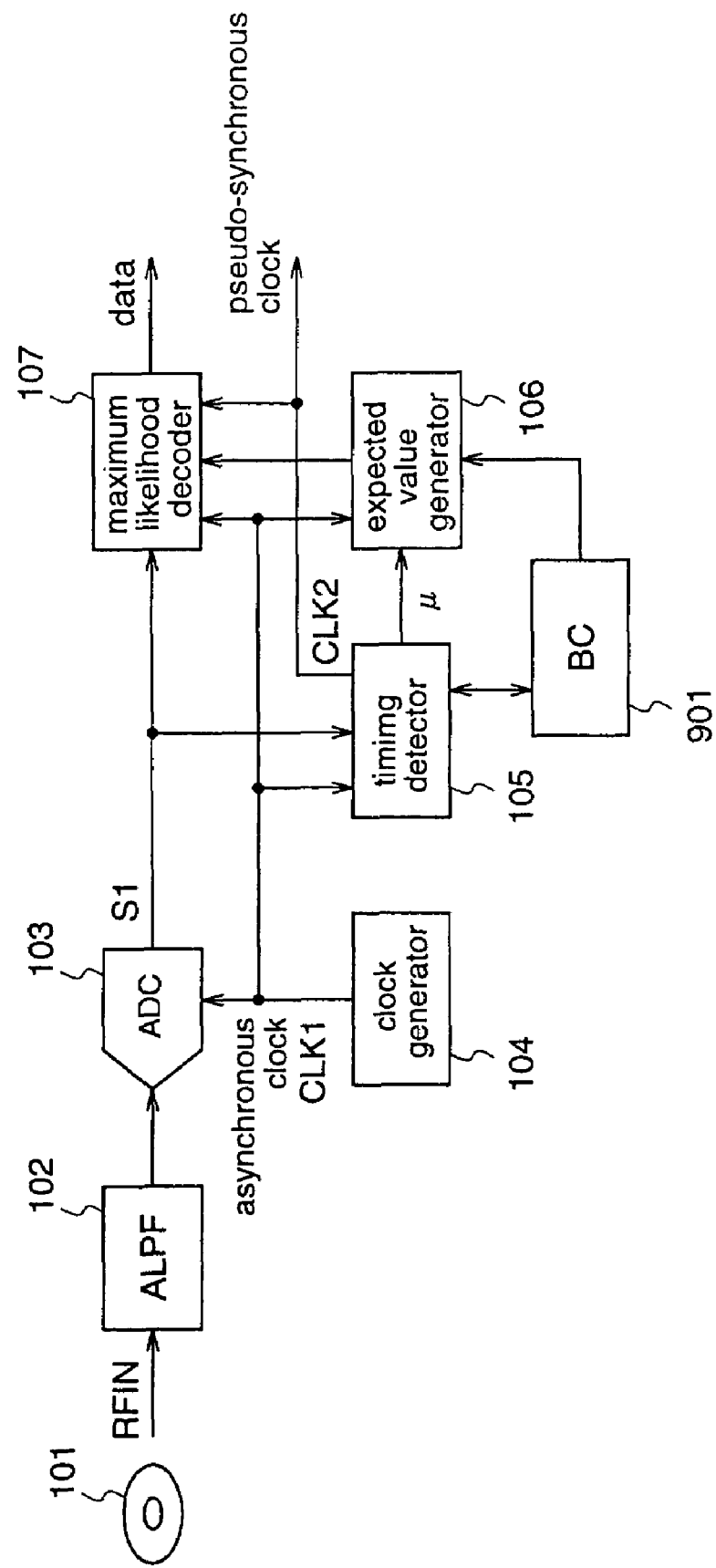
FIG. 9 is a diagram illustrating the construction of an information reproduction apparatus according to a third embodiment of the present invention.

FIG. 9 is a block diagram illustrating the information reproduction apparatus 900 according to the third embodiment. With reference to FIG. 9, 901 denotes a baseline control circuit (BC) that detects a DC component in the information reproduction apparatus 900, and performs control so that the value of the DC component becomes to have an appropriate level. In FIG. 9, the same constituents as those shown in FIG. 1 are given the same reference numerals to omit descriptions thereof.

Next, the operation will be described.

As described for the first embodiment, the analog data that is read from the medium 101 is subjected to A/D conversion by the ADC 103, and then outputted to the phase comparator 205 in the timing detector 105. Further, the clock generator 104 generates an asynchronous clock CLK1, and outputs it to the phase comparator 205.

The output signal of the phase comparator 205 is outputted to the NCO control value calculator 206 as in the first embodiment, and to the BC 901.

On receipt of the output of the phase comparator 205, the BC 901 detects rising points and falling points of the output signal waveform to detect a DC component. Then, the BC 901 obtains a baseline error, i.e., a correction amount, on the basis of the detected DC component, and outputs a control signal indicating the correction amount to the expected value generator 106.

In the expected value generator 106, the generated expected values are corrected according to the control signal outputted from the BC 901. For example, the baseline error is subtracted from the generated expected values, whereby the whole expected value sequence is raised up.

Then, the maximum likelihood decoder 107 calculates reproduced data on the basis of the corrected expected value and the ADC output S1 as in the above-mentioned first embodiment.

Hereinafter, a description will be given of the effect of the information reproduction apparatus 900 according to the third embodiment.

In a read channel system like the present invention or the above-mentioned prior art, usually, a baseline control circuit is disposed immediately after an A/D converter, and a DC component to be a reference value for a slicer or the like is corrected by control of the baseline control circuit. FIG. 8(*a*) is a diagram illustrating a waveform that is obtained after an analog reproduction waveform having asymmetry is digitized by an A/D converter having a resolution of 7 bits. In FIG. 8(*a*), in order to sufficiently utilize the range of the A/D converter, the waveform is controlled so that the maximum value and the minimum value thereof are 63 and −64, respectively. Since the data to be written in the DVD is encoded so that the number of "1" and the number of "0" are equal to each other if the reference value is 0, it is necessary to correct the reference value in FIG. 8(*a*). The baseline control circuit counts the number of "1" and the number of "0" to detect a DC component, and thereafter, determines a reference value so that the number of 1s and the number of 0s become equal to each other, whereby the whole waveform is raised up, thereby correcting the baseline. The output of the baseline control circuit is shown in FIG. 8(*b*). As shown in FIG. 8(*b*), when the baseline control circuit raises the whole waveform upward, the values exceeding 63 are compulsorily saturated to 63. Therefore, when baseline correction is carried out with the baseline control circuit being disposed immediately after the A/D converter, distortion occurs in the signal waveform.

Since maximum likelihood decoding sufficiently utilizes the information of the signal waveform in the amplitude direction, such distortion significantly affects the precision of data reproduction.

According to the third embodiment, since the ADC output S1 is directly inputted to the maximum likelihood decoder 107 and the expected values generated by the expected value generator 106 are corrected to correct the DC component, it is possible to avoid distortion of the signal which occurs when correcting the ADC output S1, whereby maximum likelihood decoding can be carried out with the information in the amplitude direction being sufficiently utilized, resulting in more precise data reproduction.

Figure 10:
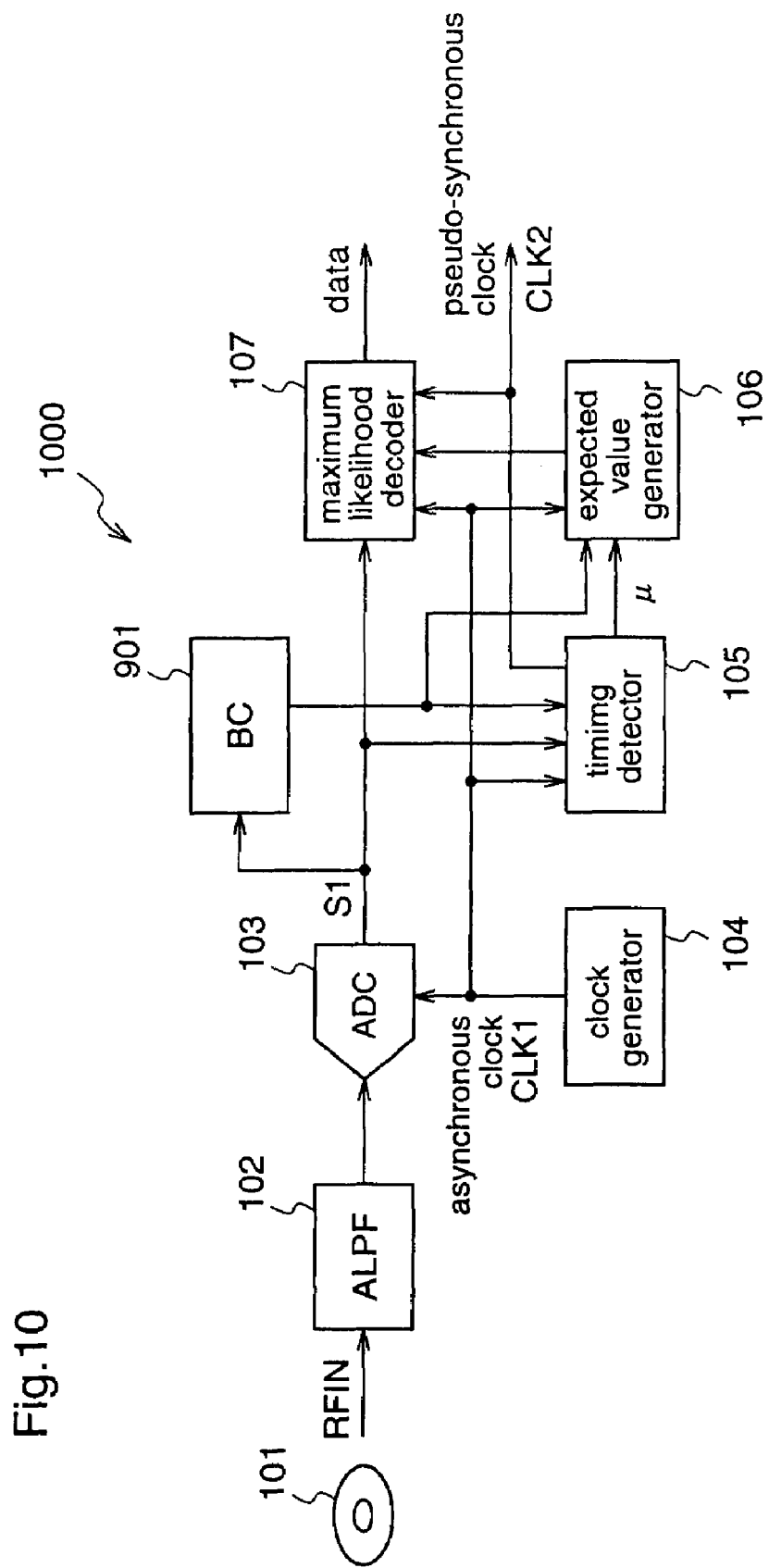
FIG. 10 is a diagram illustrating a modification of the construction of the information reproduction apparatus according to the third embodiment.

Since the baseline error of the DC component can also be obtained directly from the ADC output S1, the BC 901 may be disposed immediately after the ADC 103 to supply the output signal of the BC to the timing detector 105 and the expected value generator 106 as shown in FIG. 10. Also in this cases, the same effects as described in this third embodiment can be achieved.

As described above, according to the third embodiment, the baseline controller (BC) that detects a DC component and performs level control for the DC component is provided, and the expected values outputted from the expected value generator 106 are corrected on the basis of the output of the BC 901. Therefore, the output of the A/D converter can be directly inputted to the maximum likelihood sequence detector, whereby maximum likelihood decoding sufficiently utilizing the information in the amplitude direction can be carried out, resulting in highly precise data reproduction.

Embodiment 4

According to a fourth embodiment, in the information reproduction apparatus according to the first embodiment, the expected values generated by the expected value generator 106 are adaptively controlled on the basis of the reproduced data that is outputted from the maximum likelihood decoder 107.

Figure 12A:
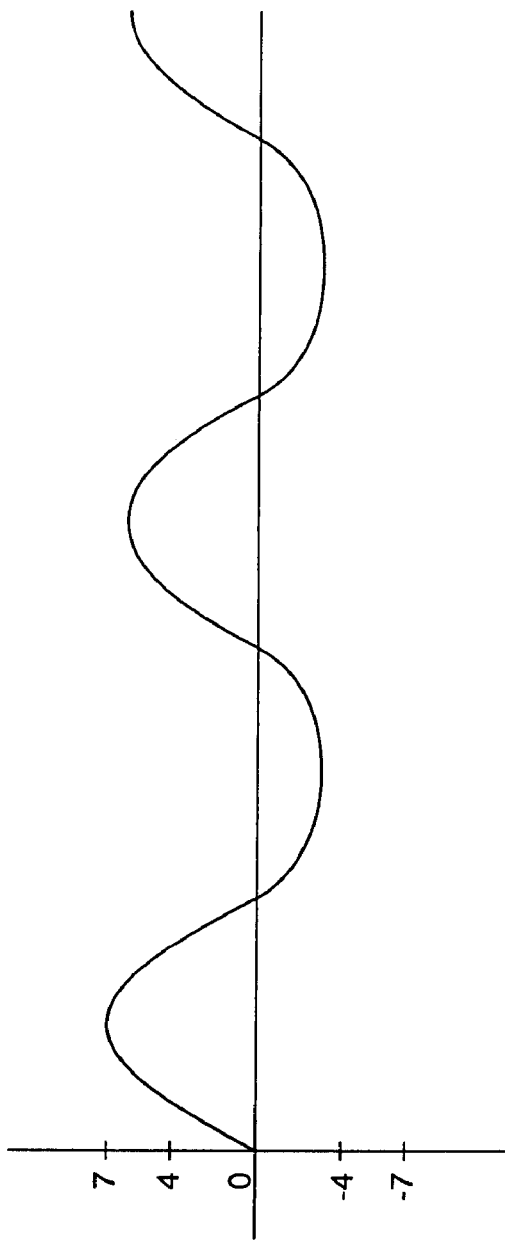
FIG. 12 is a diagram illustrating an analog signal waveform that is read from a medium.
Figure 12B:
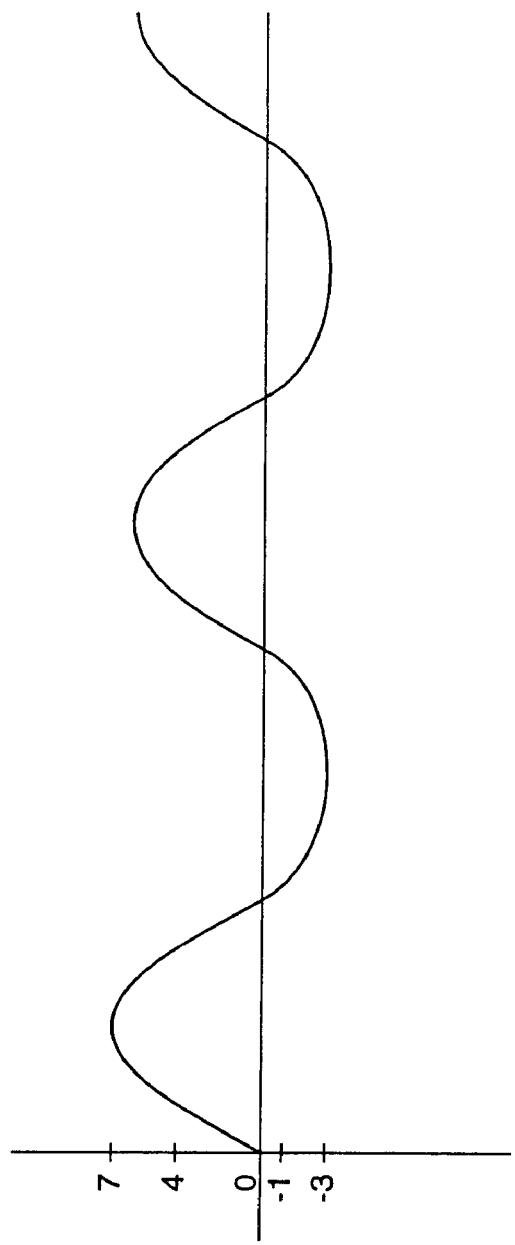

When the analog reproduction waveform outputted from the medium 101 is a waveform that is vertically symmetric, five values of {−7,−4,0,4,7} are enough as the expected values that are previously set and to be used in the expected value generator 106, when the expected values are completely equalized to the PR(3,4,4,3). However, when the analog reproduction signal waveform outputted from the medium 101 is an asymmetric waveform in which the lower side waveform is distorted as shown in FIG. 12(*a*), sufficient results cannot be obtained with the predetermined expected values. Therefore, in this fourth embodiment, the expected values generated by the expected value generator 106 are adaptively controlled on the basis of the reproduced data that is outputted from the maximum likelihood decoder 107.

Figure 11:
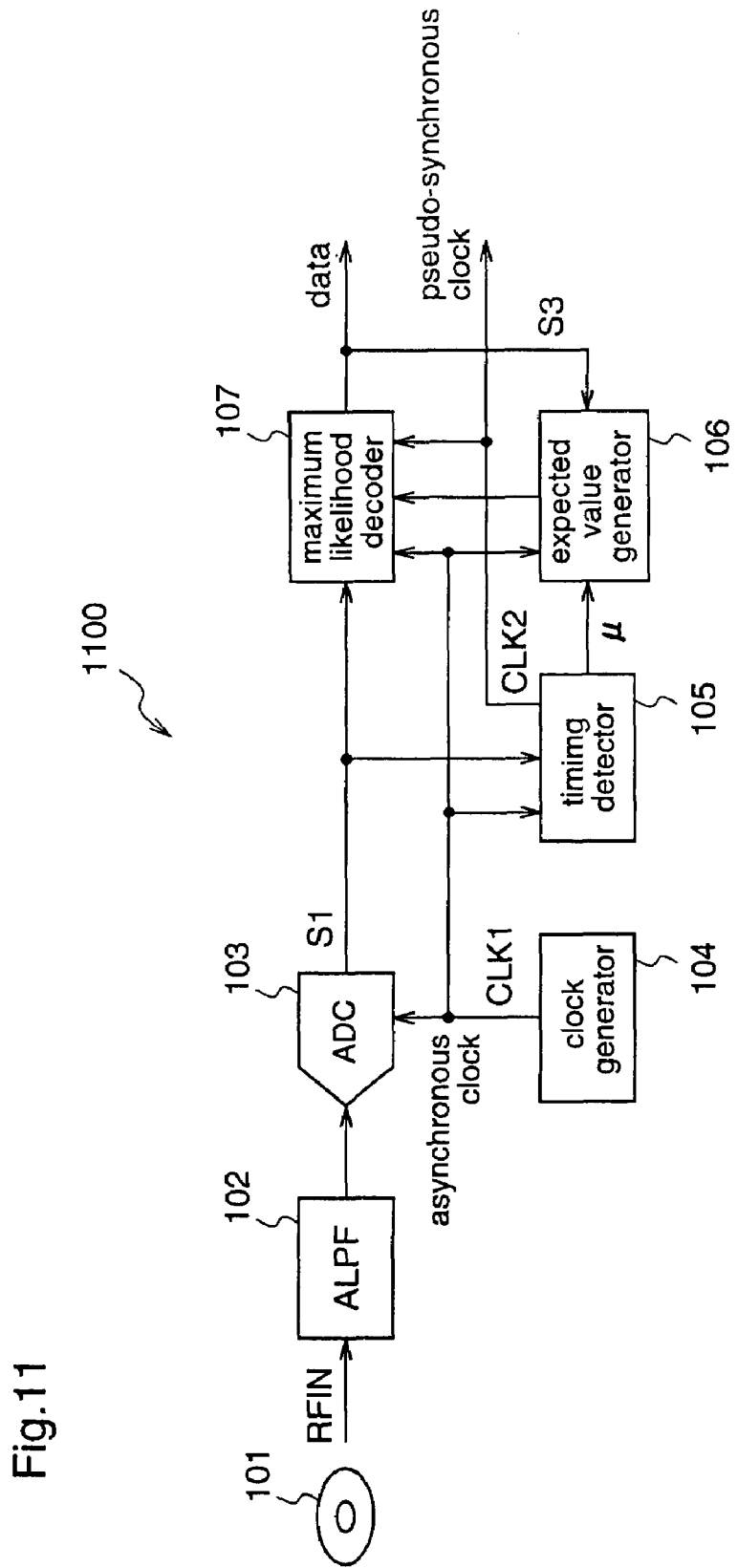
FIG. 11 is a diagram illustrating the construction of an information reproduction apparatus according to a fourth embodiment of the present invention.

FIG. 11 is a diagram illustrating the information reproduction apparatus according to the fourth embodiment. The same constituents as those shown in FIG. 1 are given the same reference numerals, and descriptions thereof will be omitted. In FIG. 11, the output signal of the maximum likelihood decoder 107 is inputted to the expected value generator 106. The expected value generator 106 according to the fourth embodiment is provided with a distortion amount detection circuit for detecting a distortion amount of the analog reproduction signal waveform outputted from the medium 101 on the basis of the decoded data S3 outputted from the maximum likelihood decoder 107, and a control circuit for adaptively controlling the expected value according to the distortion amount, although these units are not shown in the figure.

Next, the operation will be described.

As described in the first embodiment, the analog data read from the medium 101 is subjected to A/D conversion by the ADC 103, and inputted to the maximum likelihood decoder 107. The maximum likelihood decoder 107 outputs final reproduced data on the basis of the ADC output S1 and the expected value outputted from the expected value generator 106.

On receipt of the reproduced data S3 outputted from the maximum likelihood decoder 107, the expected value generator 106 obtains a distortion amount of the analog reproduction signal waveform of the medium 101 from the data, and selects an expected value of a default according to the detected amount. For example, when the lower side of the waveform is distorted as shown in FIG. 12(*b*), −1 is selected instead of −4 and −3 is selected instead of −7, as expected values. Then, the newly selected expected values are interpolated according to the parameter μ that is outputted from the timing detector 105 as in the first embodiment, and the resultant value is outputted to the maximum likelihood decoder 107.

The maximum likelihood decoder 107 outputs reproduced data on the basis of the corrected expected values and the ADC output S1.

As described above, according to the fourth embodiment, since the expected values outputted from the expected value generator 106 are adaptively controlled on the basis of the reproduced data outputted from the maximum likelihood decoder 107, even when the signal waveform that is read from the medium 101 is extremely distorted, reproduction of accurate recorded data can be carried out.

APPLICABILITY IN INDUSTRY

An information reproduction apparatus according to the present invention is provided with an expected value generator that generates expected values by interpolation, whereby data reproduction with less errors can be carried out, and therefore, it is useful as a reproduction apparatus for optical discs such as a DVD, and further, it is also applicable to information reproduction of media other than optical discs.

The invention claimed is:

1. An information reproduction apparatus including:
a data reading unit for reading a first signal including data information and timing information from an information recording medium;
a first clock generation unit for generating a first clock;
a data conversion unit for processing the first signal at the timing of the first clock to obtain a second signal;
a timing detection unit for obtaining timing error information between the timing included in the first signal and the timing of the first clock; and
plural branch metric calculation units for calculating plural branch metrics from the second signal and the timing error information at the timing of the first clock;
wherein the first clock generation unit is controlled on the basis of the timing error information so that the frequency of the first clock is always higher than the frequency of the timing included in the first signal.

2. An information reproduction apparatus including:
a data reading unit for reading a first signal including data information and timing information from an information recording medium;
a first clock generation unit for generating a first clock;
a data conversion unit for processing the first signal at the timing of the first clock to obtain a second signal;
a timing detection unit for obtaining timing error information between the timing included in the first signal and the timing of the first clock; and
plural branch metric calculation units for calculating plural branch metrics from the second signal and the timing error information at the timing of the first clock, further including:
a second clock generation unit for outputting a second clock that is pseudo-synchronized with the timing included in the first signal; and
an expected value generation unit for outputting plural expected values based on the timing error information;
wherein data corresponding to a sequence having the highest likelihood with the sequence of the second signal among the sequences of the plural expected values is outputted as reproduced data at the timing of the second clock,
wherein said expected value generation unit is provided with expected values of divisional points that are obtained by dividing the spaces between points that are synchronized with the timing included in the first signal, in the time-axis direction, and selects a specific expected value from among the expected values of the divisional points on the basis of the timing error information outputted from the timing detection unit.

3. An information reproduction apparatus including:
a data reading unit for reading a first signal including data information and timing information from an information recording medium;
a first clock generation unit for generating a first clock;
a data conversion unit for processing the first signal at the timing of the first clock to obtain a second signal;
a timing detection unit for obtaining timing error information between the timing included in the first signal and the timing of the first clock; and
plural branch metric calculation units for calculating plural branch metrics from the second signal and the timing error information at the timing of the first clock, further including:
a second clock generation unit for outputting a second clock that is pseudo-synchronized with the timing included in the first signal; and
an expected value generation unit for outputting plural expected values based on the timing error information;
wherein data corresponding to a sequence having the highest likelihood with the sequence of the second signal among the sequences of the plural expected values is outputted as reproduced data at the timing of the second clock,
wherein said calculation unit includes a path metric calculation unit for calculating path metrics using the branch metrics, on the basis of the second clock.

4. An information reproduction apparatus including:
a data reading unit for reading a first signal including data information and timing information from an information recording medium;
a first clock generation unit for generating a first clock;
a data conversion unit for processing the first signal at the timing of the first clock to obtain a second signal;
a timing detection unit for obtaining timing error information between the timing included in the first signal and the timing of the first clock; and
plural branch metric calculation units for calculating plural branch metrics from the second signal and the timing error information at the timing of the first clock, further including:
a second clock generation unit for outputting a second clock that is pseudo-synchronized with the timing included in the first signal; and
an expected value generation unit for outputting plural expected values based on the timing error information,
wherein data corresponding to a sequence having the highest likelihood with the sequence of the second signal among the sequences of the plural expected values is outputted as reproduced data at the timing of the second clock,
wherein, when plural edges of the first clock exist between edges of the second clock, said branch metric calculation unit calculates branch metrics from the second signals which correspond to the respective edges of the first clock.

5. An information reproduction apparatus including:
a data reading unit for reading a first signal including data information and timing information from an information recording medium;
a first clock generation unit for generating a first clock;
a data conversion unit for processing the first signal at the timing of the first clock to obtain a second signal;

a timing detection unit for obtaining timing error information between the timing included in the first signal and the timing of the first clock; and plural branch metric calculation units for calculating plural branch metrics from the second signal and the timing error information at the timing of the first clock, further including:
  a second clock generation unit for outputting a second clock that is pseudo-synchronized with the timing included in the first signal; and
  an expected value generation unit for outputting plural expected values based on the timing error information;
wherein data corresponding to a sequence having the highest likelihood with the sequence of the second signal among the sequences of the plural expected values is outputted as reproduced data at the timing of the second clock,
wherein, when plural edges of the first clock exist between edges of the second clock, said branch metric calculation unit calculates branch metrics from the second signal which corresponds to the edge of the first clock that is closest to the edge of the second clock.

6. An information reproduction method including:
a data reading step of reading a first signal including data information and timing information from an information recording medium;
a clock generation step of generating a first clock;
a data conversion step of processing the first signal at the timing of the first clock to obtain a second signal;
a timing detection step of obtaining timing error information between the timing included in the first signal and the timing of the first clock;
plural branch metric calculation steps of calculating plural branch metrics from the second signal and the timing error information at the timing of the first clock,
wherein the frequency of the first clock is changed on the basis of the timing error information so that the frequency of the first clock is always higher than the frequency of the timing included in the first signal.

7. An information reproduction method including:
a data reading step of reading a first signal including data information and timing information from an information recording medium;
a clock generation step of generating a first clock;
a data conversion step of processing the first signal at the timing of the first clock to obtain a second signal;
a timing detection step of obtaining timing error information between the timing included in the first signal and the timing of the first clock;
plural branch metric calculation steps of calculating plural branch metrics from the second signal and the timing error information at the timing of the first clock, further including:
  a second clock generation step of outputting a second clock that is pseudo-synchronized with the timing included in the first signal; and
  an expected value generation step of outputting plural expected values based on the timing error information;
wherein data corresponding to a sequence having the highest likelihood with the sequence of the second signal among the sequences of the plural expected values is outputted as reproduced data at the timing of the second clock,
wherein said expected value generation step reads expected values of divisional points that are obtained by dividing the spaces between points that are synchronized with the timing included in the first signal, in the time-axis direction, and selects a specific expected value from among the expected values of the divisional points on the basis of the timing error information.

8. An information reproduction method including:
a data reading step of reading a first signal including data information and timing information from an information recording medium;
a clock generation step of generating a first clock;
a data conversion step of processing the first signal at the timing of the first clock to obtain a second signal;
a timing detection step of obtaining timing error information between the timing included in the first signal and the timing of the first clock;
plural branch metric calculation steps of calculating plural branch metrics from the second signal and the timing error information at the timing of the first clock, further including:
  a second clock generation step of outputting a second clock that is pseudo-synchronized with the timing included in the first signal; and
  an expected value generation step of outputting plural expected values based on the timing error information;
wherein data corresponding to a sequence having the highest likelihood with the sequence of the second signal among the sequences of the plural expected values is outputted as reproduced data at the timing of the second clock,
wherein said calculation step includes a path metric calculation step of calculating path metrics using the branch metrics, on the basis of the second clock.

9. An information reproduction method including:
a data reading step of reading a first signal including data information and timing information from an information recording medium;
a clock generation step of generating a first clock;
a data conversion step of processing the first signal at the timing of the first clock to obtain a second signal;
a timing detection step of obtaining timing error information between the timing included in the first signal and the timing of the first clock;
plural branch metric calculation steps of calculating plural branch metrics from the second signal and the timing error information at the timing of the first clock, further including:
  a second clock generation step of outputting a second clock that is pseudo-synchronized with the timing included in the first signal; and
  an expected value generation step of outputting plural expected values based on the timing error information;
wherein data corresponding to a sequence having the highest likelihood with the sequence of the second signal among the sequences of the plural expected values is outputted as reproduced data at the timing of the second clock,
wherein, when plural edges of the first clock exist between edges of the second clock, said branch metric calculation step calculates branch metrics from the second signals which correspond to the respective edges of the first clock.

10. An information reproduction method including:
a data reading step of reading a first signal including data information and timing information from an information recording medium;

a clock generation step of generating a first clock;

a data conversion step of processing the first signal at the timing of the first clock to obtain a second signal;

a timing detection step of obtaining timing error information between the timing included in the first signal and the timing of the first clock;

plural branch metric calculation steps of calculating plural branch metrics from the second signal and the timing error information at the timing of the first clock, further including:

a second clock generation step of outputting a second clock that is pseudo-synchronized with the timing included in the first signal; and an expected value generation step of outputting plural expected values based on the timing error information;

wherein data corresponding to a sequence having the highest likelihood with the sequence of the second signal among the sequences of the plural expected values is outputted as reproduced data at the timing of the second clock, wherein, when plural edges of the first clock exist between edges of the second clock, said branch metric calculation step calculates branch metrics from the second signal which corresponds to the edge of the first clock that is closest to the edge of the second clock.

* * * * *